US007996611B2

(12) United States Patent
Nakagawa et al.

(10) Patent No.: US 7,996,611 B2
(45) Date of Patent: Aug. 9, 2011

(54) BACKUP DATA MANAGEMENT SYSTEM AND BACKUP DATA MANAGEMENT METHOD

(75) Inventors: Hirotaka Nakagawa, Sagamirhara (JP); Masayasu Asano, Yokohama (JP); Masayuki Yamamoto, Sagamihara (JP); Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 752 days.

(21) Appl. No.: 12/107,979

(22) Filed: Apr. 23, 2008

(65) Prior Publication Data

US 2009/0228670 A1    Sep. 10, 2009

(30) Foreign Application Priority Data

Mar. 6, 2008 (JP) ................. 2008-056907

(51) Int. Cl.
*G06F 12/00* (2006.01)
(52) U.S. Cl. ........ 711/114; 711/156; 711/162; 711/221; 707/634; 707/639; 707/649; 714/6.1; 714/25
(58) Field of Classification Search .................. 711/114, 711/156, 162, 221; 707/634, 639, 649; 714/6.1, 714/25
See application file for complete search history.

(56) References Cited

U.S. PATENT DOCUMENTS

| 7,139,888 | B2* | 11/2006 | Umemura ...................... 711/162 |
| 7,433,899 | B2* | 10/2008 | Pearson et al. ...................... 1/1 |
| 7,809,907 | B2* | 10/2010 | Uratani et al. ................. 711/162 |
| 2003/0131278 | A1 | 7/2003 | Fujibayashi |
| 2006/0031637 | A1 | 2/2006 | Komikado et al. |
| 2008/0270696 | A1* | 10/2008 | Murayama et al. ........... 711/114 |

FOREIGN PATENT DOCUMENTS

| JP | 2003-242011 | 8/2003 |
| JP | 2006-048300 | 2/2006 |

* cited by examiner

*Primary Examiner* — Stephen C Elmore
(74) *Attorney, Agent, or Firm* — Antonelli, Terry, Stout & Kraus, LLP.

(57) ABSTRACT

Provided are a backup data management system and a backup data management method capable of facilitating the management of backup data that is multiplexed between different storage apparatuses. The backup data management system includes a storage apparatus having a volume to be used by a host computer, at least one storage apparatus having volumes, and a management computer. The management computer creates a copy pair so that a snapshot of the volume included in a backup group is stored in all the volumes included in the backup group, and sets all copy pairs included in the designated backup group to a PAIR status when there is a creation request of the snapshot of the volume.

16 Claims, 21 Drawing Sheets

FIG.5

| APPARATUS ID | APPARATUS TYPE | APPARATUS IDENTIFYING INFORMATION | IP ADDRESS | DATA COMMUNICABLE APPARATUS ID |
|---|---|---|---|---|
| ST1 | STORAGE | VENDER A, MODEL A, SERIAL NUMBER AD1 | 12.12.12.12 | ST2 |
| | | | | H1 |
| ST2 | STORAGE | VENDER B, MODEL A, SERIAL NUMBER BG2 | 12.12.13.10 | ST1 |
| | | | | H1 |
| H1 | HOST COMPUTER | host-121 | 12.12.12.33 | ST1 |
| | | | | ST2 |

FIG.6

| STORAGE APPARATUS ID | VOLUME ID | CAPACITY | AG ID | ALLOCATION DESTINATION |
|---|---|---|---|---|
| ST1 | VOL001 | 10GB | AG1 | H1 |
| ST1 | VOL002 | 10GB | AG2 | Snapshot |
| ST1 | VOL003 | 10GB | AG3 | Snapshot |
| ST1 | VOL010 | 10GB | AG4 | |
| ST1 | VOL020 | 10GB | AG4 | |
| ST1 | VOL022 | 10GB | AG5 | |
| ST2 | VOL001 | 10GB | AG1 | H1 |
| ST2 | VOL002 | 10GB | AG2 | Snapshot |
| ST2 | VOL003 | 10GB | AG2 | Snapshot |
| ST2 | VOL008 | 10GB | AG3 | |
| ST2 | VOL044 | 10GB | AG4 | |
| ... | ... | ... | ... | ... |

FIG.7

| IDENTIFIER 3231 | STORAGE APPARATUS ID 3232 | VOLUME ID 3233 | COPY TYPE 3234 | COPY STATUS 3235 | COPY DESTINATION STORAGE APPARATUS ID 3236 | COPY DESTINATION VOLUME ID 3237 |
|---|---|---|---|---|---|---|
| 1 | ST1 | VOL001 | SYNCHRONOUS REMOTE | PAIR | ST2 | VOL001 |
| 2 | ST1 | VOL001 | LOCAL | PAIR | ST1 | VOL002 |
| 3 | ST2 | VOL001 | LOCAL | PAIR | ST2 | VOL002 |
| 4 | ST1 | VOL001 | LOCAL | PAIR | ST1 | VOL003 |
| 5 | ST1 | VOL003 | SYNCHRONOUS REMOTE | PAIR | ST2 | VOL003 |

| EVALUATED VALUE | RTO | BUSINESS I/O PROCESSING SPEED | RC LINE DOMINANCE | DISTANCE BETWEEN STORAGE APPARATUSES |
|---|---|---|---|---|
| 1 | MEANS 4 | MEANS 1 | MEANS 2 | MEANS 1 |
| 2 | MEANS 3 | MEANS 2 | MEANS 3 | MEANS 2 |
| 3 | MEANS 2 | MEANS 3 | MEANS 3 | MEANS 4 |
| 4 | MEANS 1 | MEANS 4 | MEANS 4 | MEANS 3 |
| 5 | MEANS 1 | MEANS 4 | MEANS 1 | MEANS 3 |

FIG.17

VOLUME SELECTION SCREEN

SNAPSHOT CREATION SOURCE VOLUME ID: ST1.VOL001 — D210

■ CANDIDATE VOLUME LIST — D250

| SELECT | STORAGE APPARATUS ID | VOLUME ID | SYSTEM REQUIREMENT | |
|---|---|---|---|---|
| ☑ | ST1 | VOL002 | REGISTER | CLEAR |
| ☐ | ST1 | VOL020 | REGISTER | CLEAR |
| ☑ | ST2 | VOL002 | REGISTER | CLEAR |
| ☐ | ST3 | VOL001 | REGISTER | CLEAR |
| ☐ | ST3 | VOL034 | REGISTER | CLEAR |

D228  D230  D240  D251  D252

D260 OK    D270 CANCEL

AVAILABLE VOLUME LIST SCREEN — D300

| SNAPSHOT GROUP ID | AVAILABLE VOLUME | SNAPSHOT CREATION DATE AND TIME |
|---|---|---|
| G001 | ST1.S1 | 2007/10/01 AM0:00 |
| | ST4.S4 | |

| FAILURE INFORMATION | |
|---|---|
| 2007/10/10 PM3:12 | STORAGE APPARATUS ST2 STOPPED |
| 2007/10/10 PM3:12 | STORAGE APPARATUS ST3 STOPPED |

FIG.21

SNAPSHOT CREATION AVAILABILITY SCREEN

| SNAPSHOT GROUP ID | SNAPSHOT STORAGE VOLUME | SNAPSHOT CREATION AVAILABILITY |
|---|---|---|
| G002 | ST1.S1 | NOT CREATABLE |
|  | ST2.S2 | CREATABLE |
|  | ST3.S3 | NOT CREATABLE |
|  | ST4.S4 | NOT CREATABLE |

| FAILURE INFORMATION | |
|---|---|
| 2007/10/10 PM3:12 | STORAGE APPARATUS ST1: ARRAY GROUP AG3 STOPPED |
|  |  |

D400

BACKUP DATA MANAGEMENT SYSTEM AND BACKUP DATA MANAGEMENT METHOD

CROSS-REFERENCES

This application relates to and claims priority from Japanese Patent Application No. 2008-056907, filed on Mar. 6, 2008, the entire disclosure of which is incorporated herein by reference.

BACKGROUND

The present invention relates to a backup data management system and a backup data management method for managing backup data that is multiplexed between different storage apparatuses in a computer system comprising a plurality of storage apparatuses.

Conventionally, a highly reliable memory apparatus (hereinafter referred to as a "storage apparatus") has a storage area (hereinafter referred to as a "volume") in the storage apparatus, and retains a local copy program for creating a replication (hereinafter referred to as a "snapshot") of the volume in another volume of the storage apparatus.

Nevertheless, there are cases where the storage apparatus becomes unavailable due to failure caused by water damage or the like, or maintenance work. Thus, demanded is a highly available storage system that multiplexes a snapshot of a volume used by a business application between different storage apparatuses so that, when the storage apparatus retaining that volume becomes unavailable, the business application is able to continue business operations with the snapshot of the other storage apparatus, and to enable the restoration (hereinafter referred to as "restore" or "restoration") of data to the volume used by the business application.

As a method of multiplexing snapshots between different storage apparatuses (hereinafter simply referred to as a "snapshot multiplexing method"), disclosed is a method of remote-copying a volume used by a business application stored in a first storage apparatus to a second storage apparatus, the first storage apparatus local-copying the volume used by the business application in the first storage apparatus, the second storage apparatus local-copying the remote-copied volume in the second storage apparatus, and coinciding the data content and created time of the snapshots created in the respective storage apparatuses (refer to Japanese Patent Laid-Open Publication No. 2003-242011).

As another snapshot multiplexing method, disclosed is a method of local-copying a volume used by a business application stored in a first storage apparatus to the first storage apparatus, and replicating the local-copied volume in a volume of a second storage apparatus via remote copy (refer to Japanese Patent Laid-Open Publication No. 2006-48300).

SUMMARY

Nevertheless, the configuration between the storage apparatuses (hereinafter simply referred to as the "inter-storage apparatus configuration") in which the snapshot is to be multiplexed; for instance, the network configuration between the storage apparatuses and the volume configuration in the storage apparatus to become the snapshot creation source and the volume configuration in the storage apparatus to become the snapshot creation destination, is diverse. Generally, since there are a plurality of inter-storage apparatus configurations in a storage system, the snapshot multiplexing method to be adopted will differ depending on the inter-storage apparatus configuration, and the method adopted in the snapshot creation routine or restoration routine will also differ for each snapshot multiplexing method.

Accordingly, upon creating a snapshot in a storage system having a plurality of inter-storage apparatus configurations, a storage administrator in charge of operating and managing snapshots needs to select the snapshot multiplexing method to be adopted in each inter-storage apparatus configuration, and configure settings based on the snapshot creation routine of the selected snapshot multiplexing method, and there is a problem in that the processing for managing snapshots is cumbersome.

The present invention was made in view of the foregoing problems. Thus, an object of the present invention is to provide a backup data management system and a backup data management method capable of facilitating the management of backup data that is multiplexed between different storage apparatuses.

In order to achieve the foregoing object, the present invention proposes a backup data management system comprising a first storage apparatus connected to a computer and having a first storage area to be used by the computer, at least one second storage apparatus connected to the first storage apparatus and having a second storage area, and a backup data management computer connected to the first storage apparatus and the second storage apparatus. The backup data management computer includes a backup group creation unit configured to create a backup group including the first storage area and at least one second storage area, a copy pair creation unit configured to create a copy pair of a copy source and a copy destination forming a pair so that backup data of the first storage area included in the backup group is stored in all second storage areas included in the backup group, and a copy command unit configured to set all copy pairs included in the backup group to a copy status when there is a creation request of backup data of the first storage area designating the backup group.

In order to achieve the foregoing object, the present invention additionally proposes a backup data management method to be used in a backup data management system comprising a first storage apparatus connected to a computer and having a first storage area to be used by the computer, at least one second storage apparatus connected to the first storage apparatus and having a second storage area, and a backup data management computer connected to the first storage apparatus and the second storage apparatus. The backup data management methods comprises a backup group creation step for creating a backup group including the first storage area and at least one second storage area, a copy pair creation step for creating a copy pair of a copy source and a copy destination forming a pair so that backup data of the first storage area included in the backup group is stored in all second storage areas included in the backup group, and a copy command step for setting all copy pairs included in the backup group to a copy status when there is a creation request of backup data of the first storage area designating the backup group.

According to the present invention, since a copy pair of a copy source and a copy destination forming a pair is created so that backup data of the first storage area included in a backup group is stored in all second storage areas included in that backup group, and all copy pairs included in the backup group is set to a copy status when there is a creation request of backup data of the first storage area designating that backup group, backup data of the first storage area included in the designated backup group can be stored in all second storage areas included in the designated backup group.

According to the present invention, since backup data of the first storage area included in the designated backup group can be stored in all second storage areas included in the designated backup group, the backup data to be duplicated between the first storage apparatus and the second storage apparatus can be consolidated with only the backup group, and the management of backup data to be multiplexed between different storage apparatuses can be facilitated thereby.

DESCRIPTION OF DRAWINGS

FIG. 5 is a diagram explaining an apparatus management table retained in the management computer shown in FIG. 1;

FIG. 6 is a diagram explaining a volume management table retained in the management computer shown in FIG. 1;

FIG. 7 is a diagram explaining a copy pair management table retained in the management computer shown in FIG. 1;

FIG. 9 is a diagram explaining a snapshot duplication method evaluation table retained in the management computer shown in FIG. 1;

FIG. 17 is a diagram explaining a volume selection screen;

FIG. 20 is a diagram explaining an available volume list screen; and

FIG. 21 is a diagram explaining a snapshot creation availability screen.

DETAILED DESCRIPTION

An embodiment of the present invention is now explained in detail with reference to the attached drawings.

Figure 1:
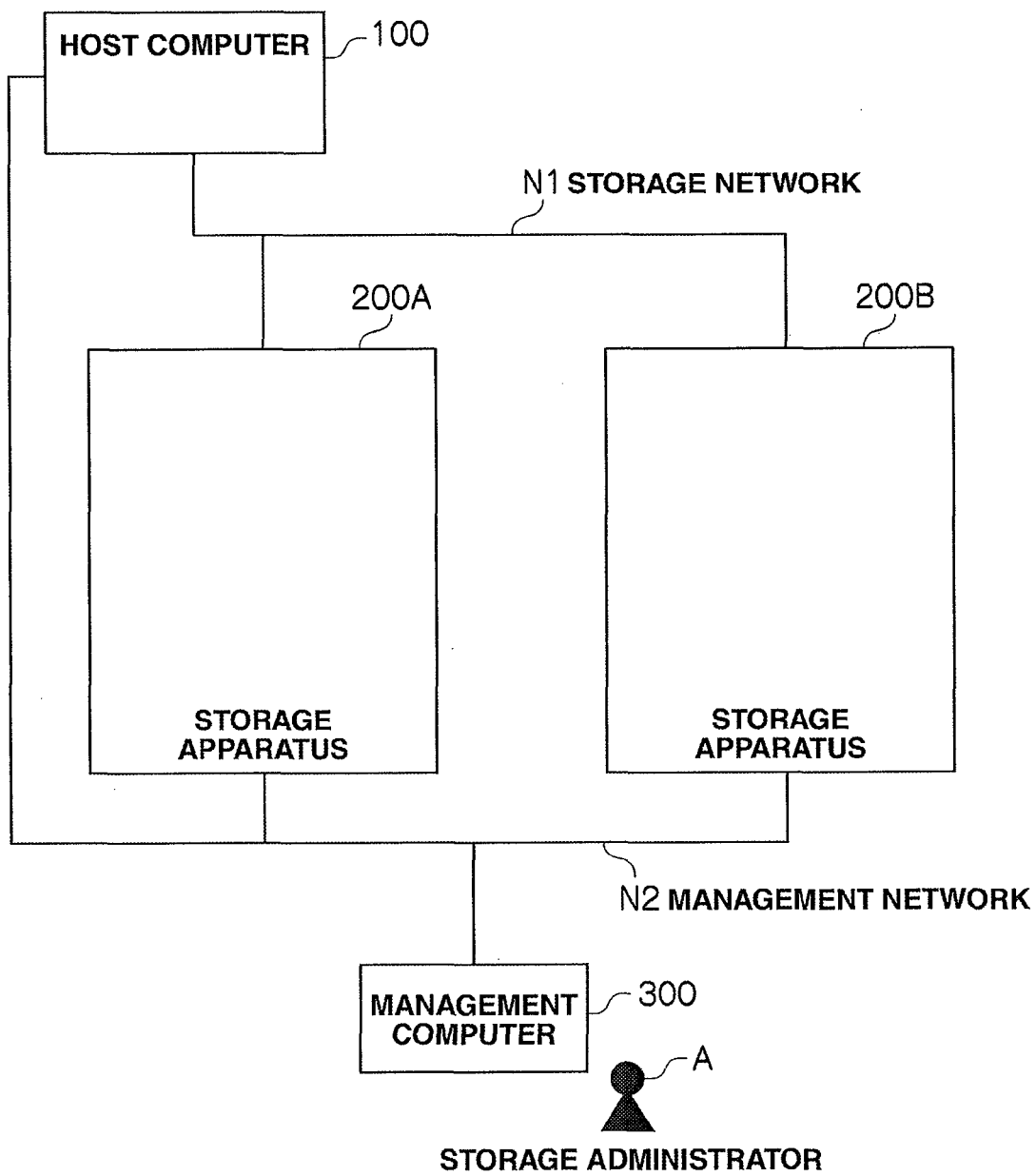
FIG. 1 is a schematic configuration diagram of a computer system.

The configuration of the present invention is foremost explained with reference to FIG. 1 to FIG. 9. As shown in FIG. 1, the computer system comprises a host computer 100, storage apparatuses 200A, 200B, and a management computer 300 to be used by a storage administrator A. The host computer 100 and the storage apparatuses 200A, 200B are connected via a storage network N1 using an FC (Fibre Channel) protocol, and the host computer 100 and the storage apparatuses 200A, 200B and the management computer 300 are connected via a management network N2 using an IP protocol.

Figure 2:
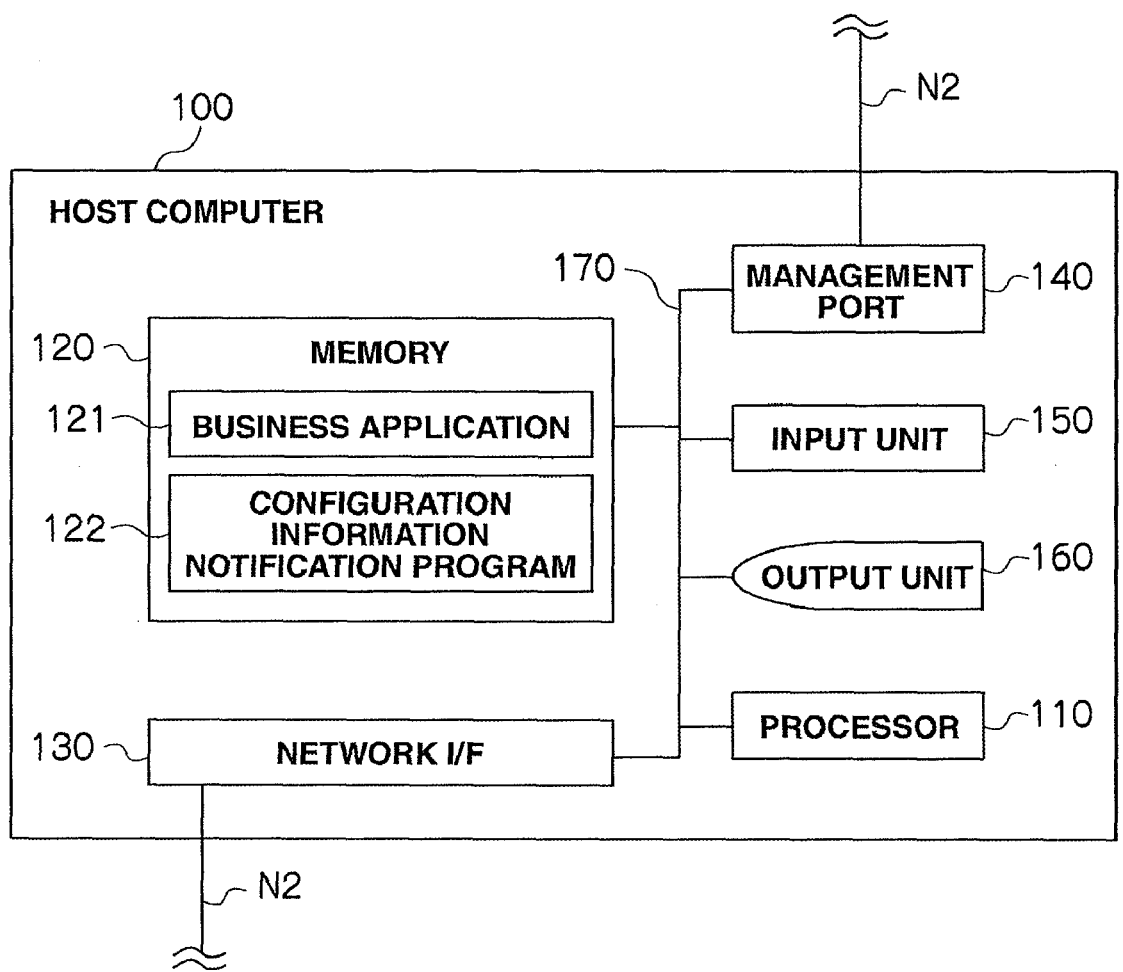
FIG. 2 is a configuration diagram of the host computer shown in FIG. 1.

As shown in FIG. 2, the host computer 100 comprises a processor 110, a memory 120, one or more network I/Fs 130 for connecting to the storage network N1, a management port 140 for connecting to the management network N2, an input unit 150 such as a keyboard or a mouse, and an output unit 160 such as a display apparatus for outputting the processing result, and the respective components are mutually connected via an internal bus 170.

A business application 121 that uses a volume 235 described later via the storage network N1 and for performing processing associated with the I/O issuance to the volume 235, a configuration information notification program 122 for notifying the configuration information of the host computer 100, and an OS (operating system; not shown) are loaded into the memory 120 from a storage medium (not shown) such as a hard disk, and are executed by the processor 110.

Figure 3:
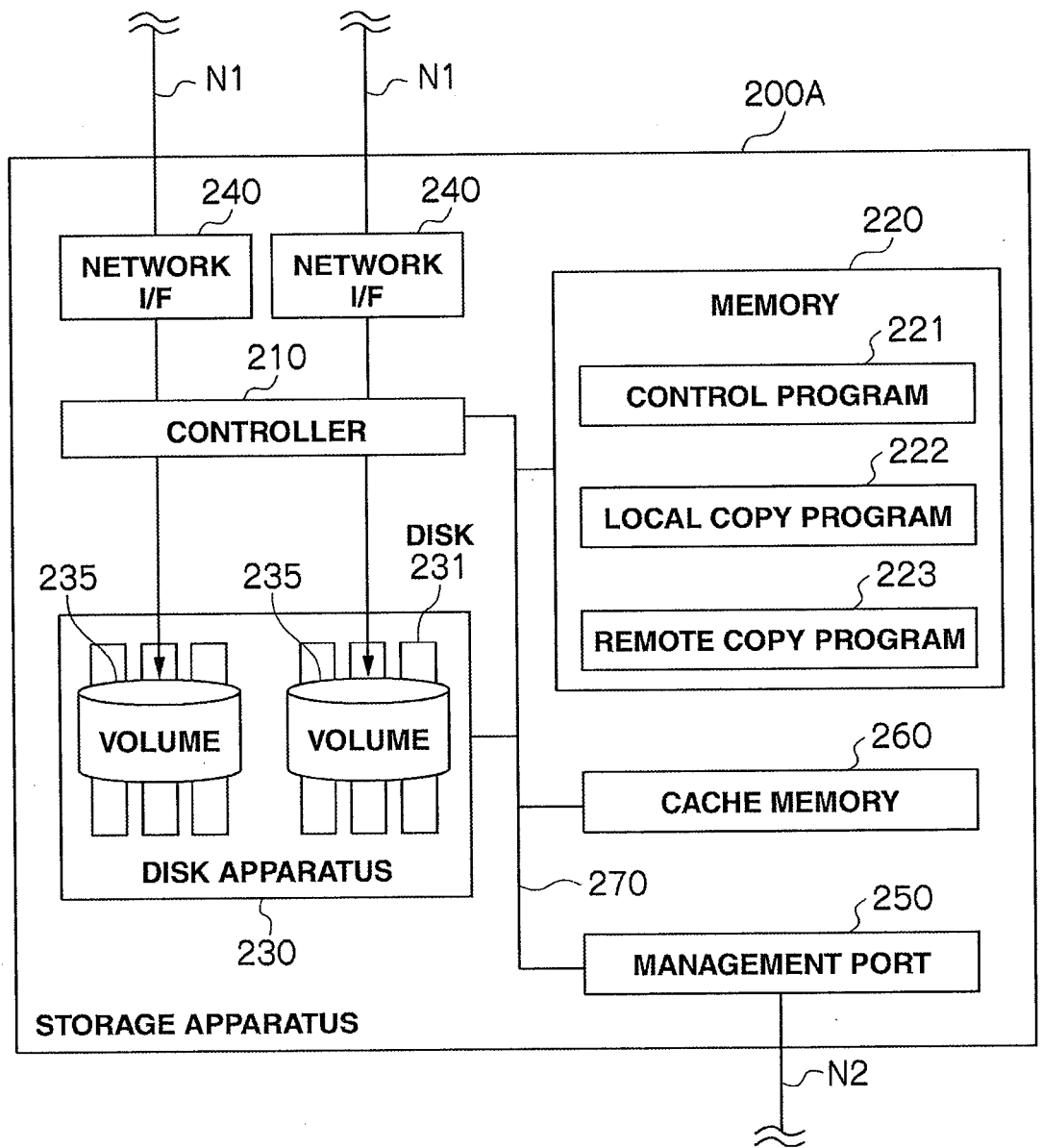
FIG. 3 is a configuration diagram of the storage apparatus shown in FIG. 1.

As shown in FIG. 3, the storage apparatus 200A comprises a controller 210 for controlling the respective components in the storage apparatus 200A, a memory 220 for storing programs and management information retained in the storage apparatus 200A, a disk apparatus 230 including disks 231 as storage mediums configured from a hard disk or the like, one or more network I/Fs 240 for connecting the storage network N1, a management port 250 for connecting to the management network N2, and a cache memory 260 for temporarily retaining a write command for writing data into the volume 235 described later, and the respective components are connected to the controller 210 via an internal path 270.

A control program 221 for managing the configuration of the storage apparatus 200A, a local copy program 222 for replicating data of the volume 235 described later and a write command for writing data into such volume 235 in another volume 235 of the storage apparatus 200A, and a remote copy program 223 for replicating data of the volume 235 and a write command for writing data into such volume 235 in a volume 235 of another storage apparatus 200B are loaded into the memory 220 from a storage medium (not shown) such as a hard disk when the storage apparatus 200A is booted, and are executed by the controller 210.

The control program 221 receives commands to be issued to the functions of the storage apparatus 200A from the management computer 300 and executes the local copy program 222 and the remote copy program 223 and sets the volumes 235 and the copy pairs. The control program 221 notifies the configuration of the storage apparatus 200A as well as the setting information and copy status of the various copy pairs to the management computer 300 via the management port 250. The control program 221 simultaneously suspends the copy of a plurality of copy pairs in which the same volume 235 in the storage apparatus 200A is the copy source volume. Here, the simultaneous suspension of a plurality of copy pairs refers to the suspension of the copy operation of the plurality of copy pairs during the period of receiving a write command from the host computer 100, passing on the same write command to a copy line of the plurality of copy pairs and receiving all processing completion notices of that write command from the copy destination, and passing on the subsequent write command to a copy line of the plurality of copy pairs.

The disk apparatus 230 is configured from one or more disks 231 having an array group (not shown) of a RAID configuration, and the volume 235 is a logical storage area in the array group.

The storage apparatus 200B is configured the same as the storage apparatus 200A, and the explanation thereof is omitted.

Figure 4:
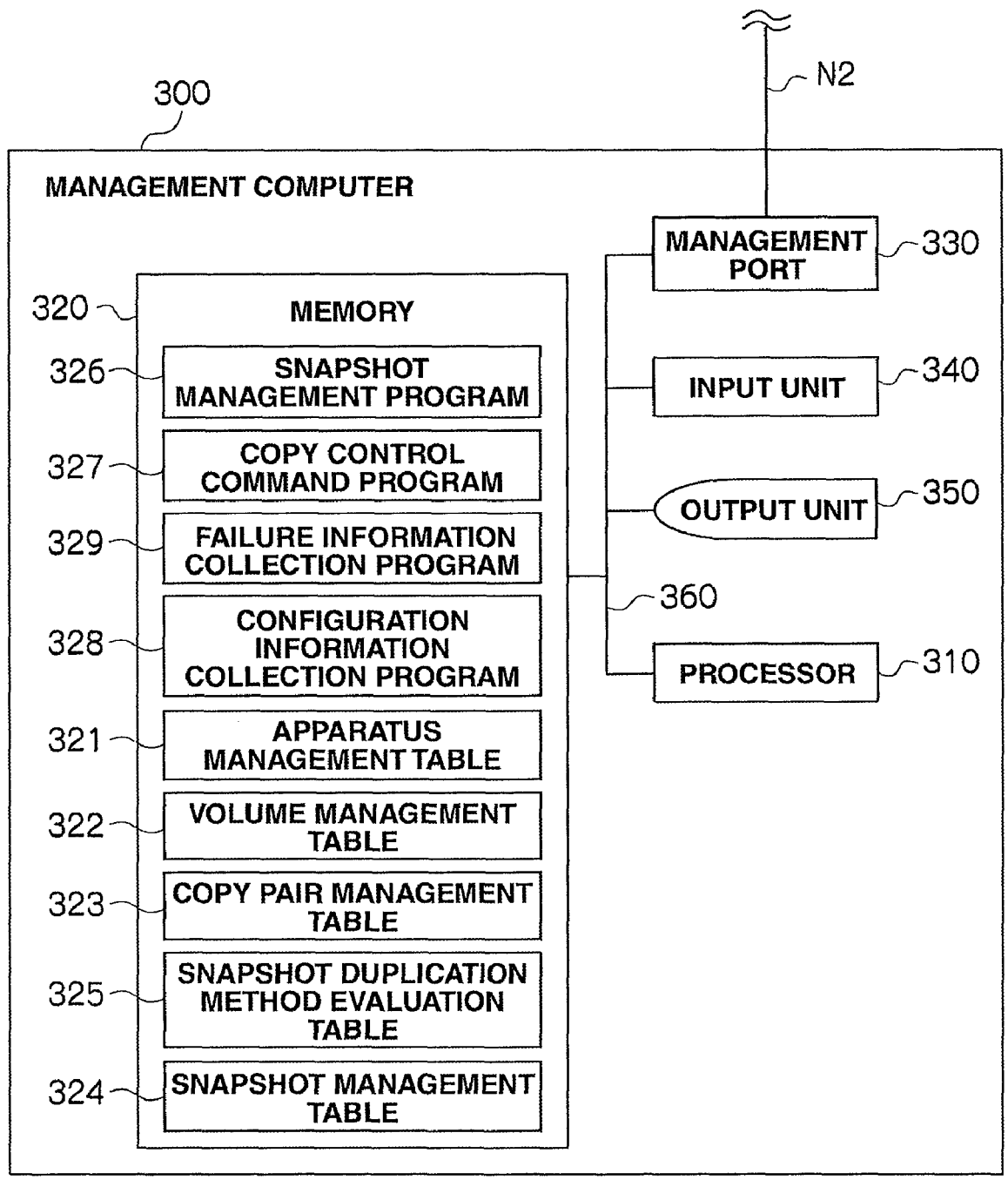
FIG. 4 is a configuration diagram of the management computer shown in FIG. 1.

As shown in FIG. 4, the management computer 300 comprises a processor 310, a memory 320, a management port 330 for connecting to the management network N2, an input unit 340 such as a keyboard or a mouse, and an output unit 350 such as a display apparatus for outputting the processing result, and the respective components are mutually connected via an internal bus 360.

An apparatus management table 321 retaining information of the host computer 100 and the storage apparatuses 200A, 200B to be managed, a volume management table 322 for managing the configuration and allocation status of the volumes 235 in the storage apparatuses 200A, 200B to be managed, a copy pair management table 323 for managing the pair configuration and pair status of the volumes 235 based on the local copy program 222 and the remote copy program 223 retained in the storage apparatuses 200A, 200B to be managed, a snapshot management table 324 for managing the snapshots of the volumes 235 used by the business application 121 in the host computer 100, a snapshot duplication method evaluation table 325 for managing the evaluation of the method for duplicating snapshots between two different storage apparatuses 200A, 200B, a snapshot management program 326 for providing an interface to be used by the storage administrator A for managing snapshots, a copy control command program 327 for commanding the storage apparatuses 200A, 200B to execute the local copy program 222 and the remote copy program 223 retained in the storage apparatuses 200A, 200B via the management port 330 and create the volumes 235, a configuration information collection program 328 for collecting the configuration information of the host computer 100 and the configuration information of the storage apparatuses 200A, 200B via the management port 330, a failure information collection program 329 for collecting the failure information of the host computer 100 and the failure information of the storage apparatuses 200A, 200B via the management port 330, an input/output program (not shown) for acquiring a request of the storage administrator A from the input unit 340 and outputting the execution result of the respective programs to the output unit 350, and an OS (not shown) are loaded into the memory 320 from a storage medium (not shown) such as a hard disk, and are executed by the processor 310.

As shown in FIG. 5, the apparatus management table 321 is configured from an apparatus ID field 3211 for storing identifiers to be used in uniquely identifying the host computer 100 and the storage apparatuses 200A, 200B in the management computer 300, an apparatus type field 3212 for storing the type of apparatus, an apparatus identifying information field 3213 for storing information to be used in uniquely identifying the apparatus to be managed by combining the vender name, model name, serial number, host name and so on of the apparatus, an IP address field 3214 for storing the IP address of the management port of the apparatus to be managed, and a data communicable apparatus ID field 3215 for storing an apparatus ID of the other party with which the apparatus to be managed is able to engage in data communication. The information to be stored in the respective fields 3211 to 3215 may be registered in advance by the storage administrator A via the input unit 340 of the management computer 300, or automatically registered using a name service (not shown) on the storage network N1 or the management network N2.

As shown in FIG. 6, the volume management table 322 is configured from a storage apparatus ID field 3221 for storing identifiers to be used in uniquely identifying the storage apparatuses 200A, 200B in the management computer 300, a volume ID field 3222 for storing identifiers to be used in uniquely identifying the volumes 235 in the storage apparatuses 200A, 200B, a capacity field 3223 for storing the allocated logical storage capacity of the volume 235, an AGID field 3224 for storing identifiers to be used in uniquely identifying the array group configuring the volumes 235 in the storage apparatuses 200A, 200B, and an allocation destination field 3225 for storing identifiers to be used in identifying the allocation destination of the volume 235 in the management computer 300. For example, if a snapshot is stored in the volume 235, the character string of "Snapshot" is stored in the allocation destination field 3225. If the volume 235 is not allocated to the host computer 100 or if a snapshot is not stored in the volume 235, "null" is stored in the allocation destination field 3225 to show that a volume can be allocated to the host computer 100 and that the host computer 100 can be used as the snapshot copy destination. The information to be stored in the respective fields 3221 to 3225 is added, changed or deleted by executing the configuration information collection program 328 described later or executing the copy control command program 327 described later when a new volume 235 is created.

As shown in FIG. 7, the copy pair management table 323 is configured from a copy pair ID field 3231 for storing identifiers to be used in uniquely identifying copy pairs in the management computer 300, a storage apparatus ID field 3232 for storing identifiers to be used in uniquely identifying the copy source storage apparatuses 200A, 200B in the management computer 300, a volume ID field 3233 for storing identifiers to be used in uniquely identifying the copy source volume 235 in the storage apparatuses 200A, 200B, a copy type field 3234 for storing the copy type (local copy or remote copy) of the copy pair, a copy status field 3235 for storing the copy status of the copy pair, a copy destination storage apparatus ID field 3236 for storing identifiers to be used in uniquely identifying the copy destination storage apparatuses 200A, 200B in the management computer 300, and a copy destination volume ID field 3237 for storing identifiers to be used in uniquely identifying the copy destination volume 235 in the storage apparatuses 200A, 200B. The information to be stored in the respective fields 3231 to 3237 is added, changed or deleted by executing the configuration information collection program 328 described later, or performing the copy operation based on the copy control command program 327 described later.

Figure 8:
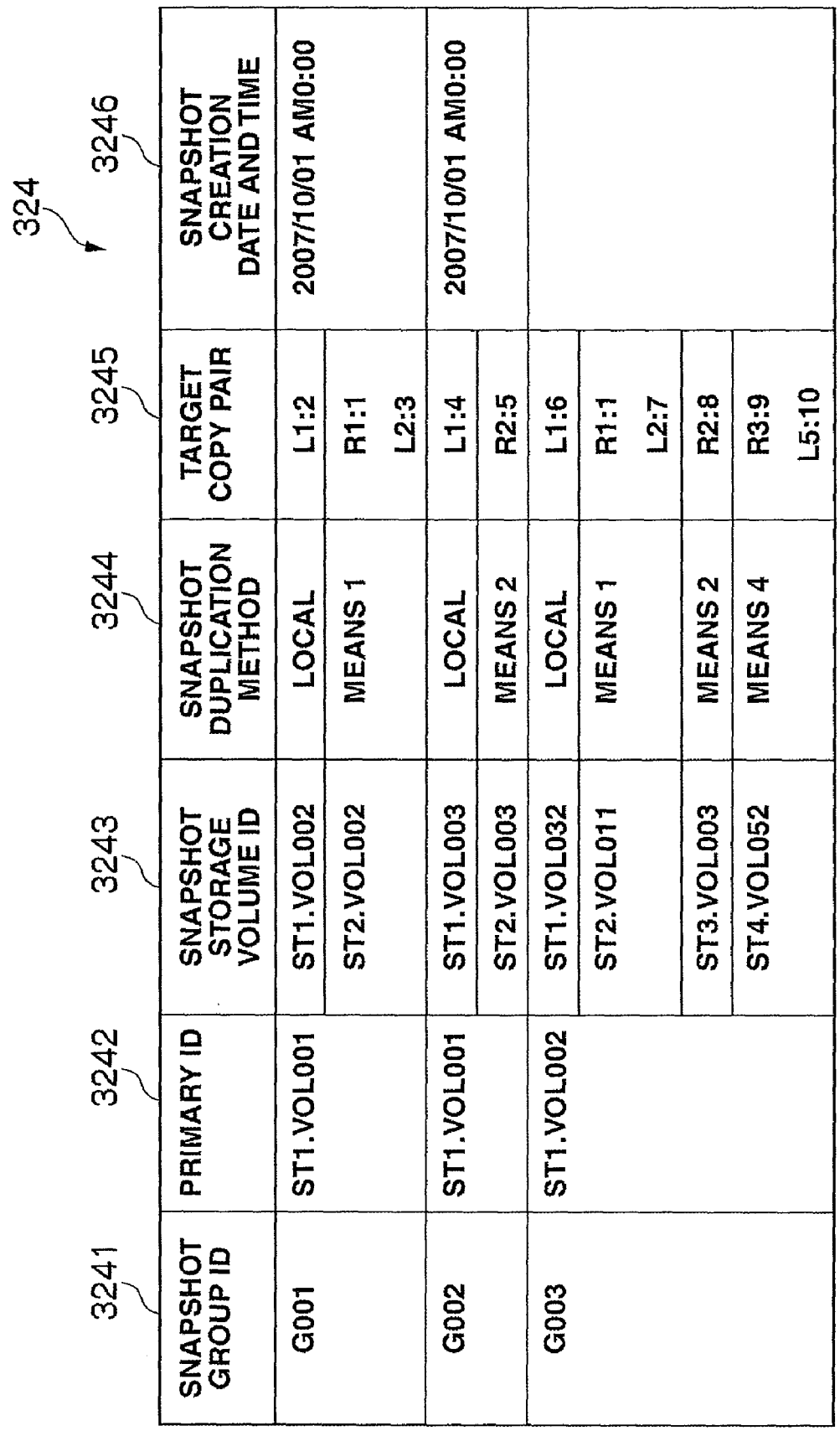
FIG. 8 is a diagram explaining a snapshot management table retained in the management computer shown in FIG. 1.

As shown in FIG. 8, the snapshot management table 324 is configured from a snapshot group ID field 3241 for storing identifiers to be used in uniquely identifying a group compiled from the volumes 235 for storing the same snapshot; that is, the simultaneous replicated data of the volumes 235 used by the business application of the host computer 100, a primary ID field 3242 storing identifiers of the volumes (hereinafter referred to as the "primary volumes") 235 used by the business application 121, a snapshot storage volume ID field 3243 storing identifiers of the volumes 325 for storing the same snapshot as the primary volumes 235 of the primary ID field 3242, a snapshot duplication method field 3244 for storing the snapshot duplication method adopted for each volume 235 of the snapshot storage volume ID field 3243, a target copy pair field 3245 for storing identifiers to be used in uniquely identifying the copy pair to be subject to the adopted snapshot duplication method in the management computer 300 by combining the model number of the copy line and the copy pair ID field 3231 of the copy pair management table 323, and a snapshot creation date and time field 3246 for storing the date and time that the snapshot was created. For instance, if the volume 235 of the snapshot storage volume ID field 3243 is stored in the same storage apparatus 200A as the primary volume 235 of the primary ID field 3242, the character string of "LOCAL" is stored in the snapshot duplication method field 3244. The information to be stored in the respective fields 3241 to 3246 is added, changed or deleted by executing the snapshot management program 326 described later.

As shown in FIG. 9, the snapshot duplication method evaluation table 325 is configured from an evaluated value field 3251 for storing the evaluated value representing the index for evaluating the snapshot duplication method described later in five stages, an RTO field 3252 for storing the snapshot duplication method corresponding to the respective evaluated values of the RTO (Recovery Time Objective), a business I/O processing speed field 3253 for storing the snapshot duplication method corresponding to the respective evaluated values of the processing speed (hereinafter referred to as the "business I/O processing speed") of write commands issued by the business application 121, an RC line dominance field 3254 for storing the snapshot duplication method corresponding to the respective evaluated values of the dominance of the remote copy line (hereinafter referred to as the "RC line dominance"), and an inter-storage apparatus distance field 3255 for storing the snapshot duplication method corresponding to the respective evaluated values of the distance between the storage apparatuses. For instance, if the evaluated value field 3251 is "5," the snapshot duplication method with the shortest RTO is stored in the RTO field 3252, the snapshot multiplexing method with the fastest business I/O processing speed is stored in the business I/O processing speed field 3253, the snapshot multiplexing method with the lowest RC line dominance is stored in the RC line dominance field 3254, and the snapshot duplication method in which the distance between the storage apparatuses is a "long distance" is stored in the inter-storage apparatus distance field 3255, respectively. Meanwhile, if the evaluated value field 3251 is "1," the snapshot duplication method with the longest RTO is stored in the RTO field 3252, the snapshot duplication method with the slowest business I/O processing speed is stored in the business I/O processing speed field 3253, a snapshot duplication method with a high RC line dominance is stored in the RC line dominance field 3254, and a snapshot duplication method in which the distance between the storage apparatuses is a "short distance" is stored in the inter-storage apparatus distance field 3255, respectively. The information to be stored in the respective fields 3251 to 3255 is set forth based on the performance of the storage apparatuses 200A, 200B and the operation policy of the computer system, and registered in advance by the storage administrator A via the input unit 340 of the management computer 300.

Operations of the copy control command program 327 and the snapshot management program 326 retained in the management computer 300 are now explained with reference to FIG. 10 to FIG. 18.

The copy control command program 327 retains a plurality of snapshot duplication methods for duplicating a snapshot between two different storage apparatuses 200A, 200B, and creates an environment for duplicating a snapshot based on a request from the snapshot management program 326.

In the environment creation request for duplicating a snapshot to be issued to the copy control command program 327, designated are the primary volume 235 as the snapshot creation source, a volume (hereinafter referred to as the "A/S volume") 235 for storing the snapshot of the same storage apparatus 200A as the primary volume 235, a volume (hereinafter referred to as the "S/volume") 235 for storing the same snapshot as the A/S volume of a storage apparatus 200B that is different from the primary volume 235, and the applicable snapshot duplication method. If there is no A/S volume in the storage apparatus 200A, it is not necessary to designate the A/S volume.

Each of the plurality of snapshot duplication methods retained in the copy control command program 327 is now explained.

Figure 10:
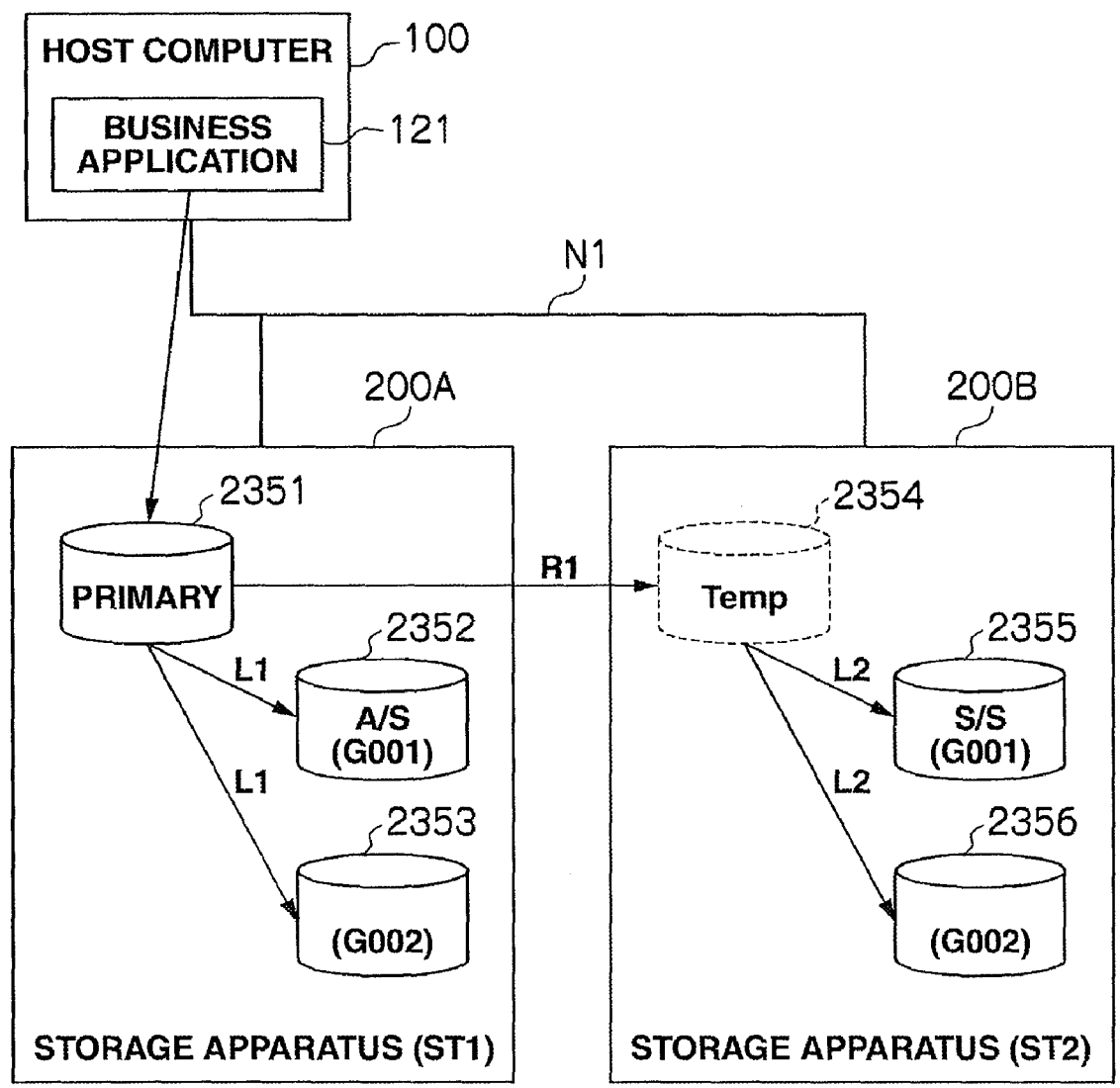
FIG. 10 is a diagram explaining the snapshot duplication method.

As shown in FIG. 10, in the first snapshot duplication method (hereinafter simply referred to as the "first method"), data of the primary volume 2351 is replicated in the A/S volume 2352 with the local copy program 222 retained in the storage apparatus 200A, replicated in a volume 2354 (hereinafter referred to as the "Temp volume") of a different storage apparatus 200B with the remote copy program 223 retained in the storage apparatus 200A, and data of the Temp volume 2354 is replicated in the S/S volume 2355 with the local copy program 222 retained in the storage apparatus 200B. Here, the copy pair of the primary volume 2351 and the A/S volume 2352 is referred to as L1, the copy pair of the primary volume 2351 and the Temp volume 2354 is referred to as R1, and the copy pair of the Temp volume 2354 and the S/S volume 2355 is referred to as L2. In the first method, the copy line of all copy pairs is constantly connected, and the copy status field 3235 of the copy pair management table 323 becomes a "PAIR" status showing that the data is constantly replicated. Thus, after the writing of data into the primary volume 2351, the A/S volume 2352 and the Temp volume 2354 in response to the write command issued by the business application 121 is complete, a write completion notice is issued to the business application 121.

When the first method is designated as the applicable snapshot duplication method in the environment creation request, the copy control command program 327 searches for a copy pair corresponding to the copy pair R1 that can be shared by a plurality of snapshot groups from the copy pair management table 323. If a corresponding copy pair does not exist, the copy control command program 327 requests the control program 221 of the storage apparatuses 200A, 200B to newly set copy pairs L1, R1, L2, requests the control program 221 of the storage apparatus 200B to newly set a volume 235 to become the Temp volume 2354, registers the newly set copy pairs L1, R1, L2 in the copy pair management table 323, and registers the newly set Temp volume 2354 in the volume management table 322. If a copy pair corresponding to the copy pair R1 exists in the copy pair management table 323, the copy control command program 327 requests the control program 221 of the storage apparatuses 200A, 200B to newly set copy pairs L1, L2, and registers the newly set copy pairs L1, L2 in the copy pair management table 323.

The snapshot creation routine of the first method is now explained. In the first method, upon creating a snapshot, the write command for writing data into the primary volume 2351 of the business application 121 is queued in the cache memory 260 to realize a status where data is not written into the primary volume 2351. Subsequently, the copy pairs L1, R1 are simultaneously suspended, and then the copy pair L2 is suspended. The same snapshot is thereby created in the A/S volume 2352 and the S/S volume 2355.

The write command queued in the cache memory 260 is applied to the primary volume 2351 at the time the copy pairs L1, R1 are suspended. When restoring data of the primary volume 2351 using the snapshot created with the first method, if the A/S volume 2352 is available, the copy direction of the copy pair L1 is reversed (hereinafter referred to as "resynching" or "resynchronization"). If the A/S volume 2352 is unavailable, the copy pair L2 is resynched, and the copy pair R1 is thereafter resynched. In a case where the backup of the primary volume 2351 is the Temp volume 2354, and the primary volume 2351 becomes unavailable and the business application 121 is using the Temp volume 2354, the volume 235 used by the business application 121 can be restored by resynching the copy pair L2.

When applying the first method to each of the plurality of snapshot groups having the same primary volume 2351, the copy pair R1 and the Temp volume 2354 are shared between the snapshot groups.

Figure 11:
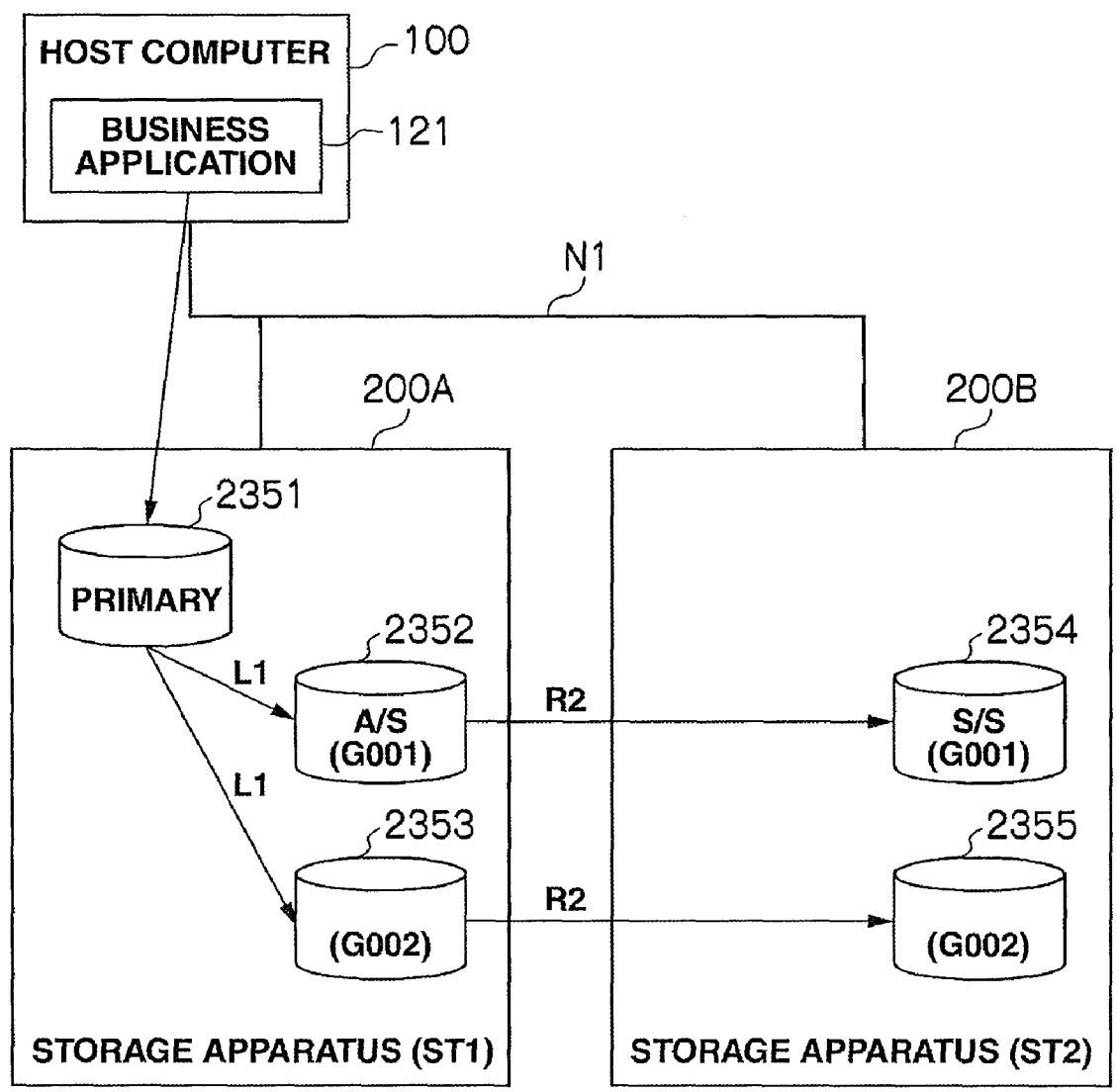
FIG. 11 is a diagram explaining the snapshot duplication method.

As shown in FIG. 11, the second snapshot duplication method (hereinafter simply referred to as the "second method") replicates the data of the primary volume 2351 in the A/S volume 2352 with the local copy program 222 retained in the storage apparatus 200A, and replicates the data of the A/S volume 2352 in the S/S volume 2354 with the remote copy program 223 retained in the same storage apparatus 200A. Here, the copy pair of the primary volume 2351 and the A/S volume 2352 is referred to as L1, and the copy pair of the A/S volume 2352 and the S/S volume 2354 is referred to as R2. In the second method, the copy line of all copy pairs is constantly connected, and the copy status field 3235 of the copy pair management table 323 becomes a "PAIR" status representing that the data is constantly replicated. Thus, a write completion notice is issued to the business application 121 in response to the write command issued by the business application 121 after the writing of data into the primary volume 2351 and the A/S volume 2352 is complete.

When the second method is designated as the applicable method in the environment creation request, the copy control command program 327 requests the control program 221 of the storage apparatuses 200A, 200B to newly set the copy pairs L1, R2 using the volume 235 of the primary volume 2351, the A/S volume 2352, and the S/S volume 2354 designated together with the second method, and registers the newly set copy pairs in the copy pair management table 323.

The snapshot creation routine of the second method is now explained. With the second method, upon creating a snapshot, the copy pair L1 is foremost suspended, and the copy pair R2 is subsequently suspended. Thereby, the same snapshot is created in the A/S volume 2352 and the S/S volume 2354.

When restoring data of the primary volume 2351 using the snapshot created with the second method, the copy pair L1 is resynched if the A/S volume 2352 is available and, if the A/S volume 2352 is unavailable, data of the S/S volume 2354 is replicated in the primary volume 2351 with the remote copy program 223 retained in the storage apparatus 200B storing the S/S volume 2354.

When applying the second method to each of the plurality of snapshot groups having the same primary volume 2351, there are no copy pairs to be shared between the snapshot groups.

The third snapshot duplication method (hereinafter simply referred to as the "third method") is the same as the second method other than that the copy pair R2 of the second method is asynchronous.

The snapshot creation routine of the third method foremost suspends the copy pair L1, and subsequently suspends the copy pair R2 when data of the A/S volume 2352 and data of the S/S volume 2354 coincide; that is, when all data to be sent from the storage apparatus 200A to the S/S volume 2354 are transferred, and the storage apparatus 200B reflects the received data in the S/S volume 2354. Thereby, the same snapshot will be created in the A/S volume and the S/S volume.

The method of restoring the primary data of the third method using the created snapshot is the same as the second method.

Figure 12:
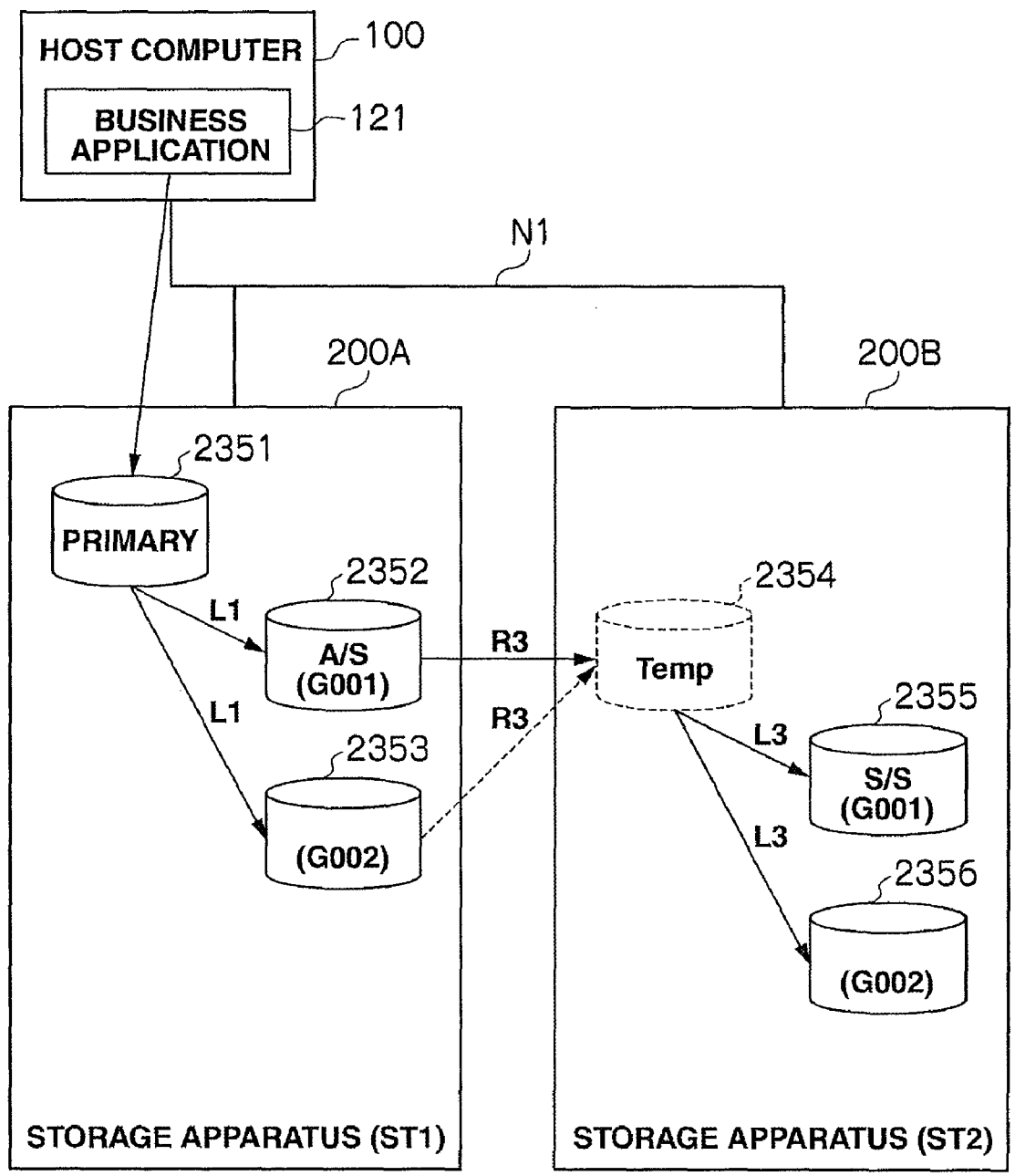
FIG. 12 is a diagram explaining the snapshot duplication method.

As shown in FIG. 12, the fourth snapshot duplication method (hereinafter simply referred to as the "fourth method") replicates the data of the primary volume 2351 in the A/S volume 2352 with the local copy program 222 retained in the storage apparatus 200A, and replicates the data of the A/S volume 2352 in the Temp volume 2354 retained in a different storage apparatus 200B with the remote copy program 223 retained in the same storage apparatus 200A. Subsequently, the storage apparatus 200B retaining the Temp volume 2354 replicates the data of the Temp volume 2354 in the S/S volume 2355 with the local copy program 222 retained in the same storage apparatus 200B. Here, the copy pair of the primary volume 2351 and the A/S volume 2352 is referred to as L1, the copy pair of the A/S volume 2352 and the Temp volume 2354 is referred to as R3, and the copy pair of the Temp volume 2354 and the S/S volume 2355 is referred to as L3. The copy line of the copy pair R3 is in a suspended state during normal times, and becomes a connected state when a snapshot is to be created.

When the fourth method is designated as the applicable method in the environment creation request, the copy control command program 327 searches for a copy pair corresponding to the copy pair R3 that is sharable among a plurality of snapshot groups, and, if a corresponding copy pair does not exist, the copy control command program 327 requests the control program 221 of the storage apparatuses 200A, 200B to newly set copy pairs L1, R3, L3, requests the control program 221 of the storage apparatus 200B to newly set the volume 235 to become the Temp volume 2354, registers the newly set copy pairs L1, R3, L3 in the copy pair management table 323, and registers the newly set Temp volume 2354 in the volume management table 322. If a copy pair corresponding to the copy pair R3 exists in the copy pair management table 323, the copy control command program 327 requests the control program 221 of the storage apparatuses 200A, 200B to newly set copy pairs L1, L3, and registers the newly set copy pairs L1, L3 in the copy pair management table 323.

The snapshot creation routine of the fourth method is now explained. In the fourth method, the copy pair L1 is foremost suspended, the copy of the copy pair R3 is subsequently resumed, and, when the copy pair R3 becomes a PAIR status, the copy pairs R3, L3 are suspended. Thereby, the same snapshot will be created in the A/S volume 2352 and the S/S volume 2355.

When applying the fourth method to each of the plurality of snapshot groups having the same primary volume 2351, it is necessary to change the copy pair R3 as needed upon creating a snapshot.

Figure 13:
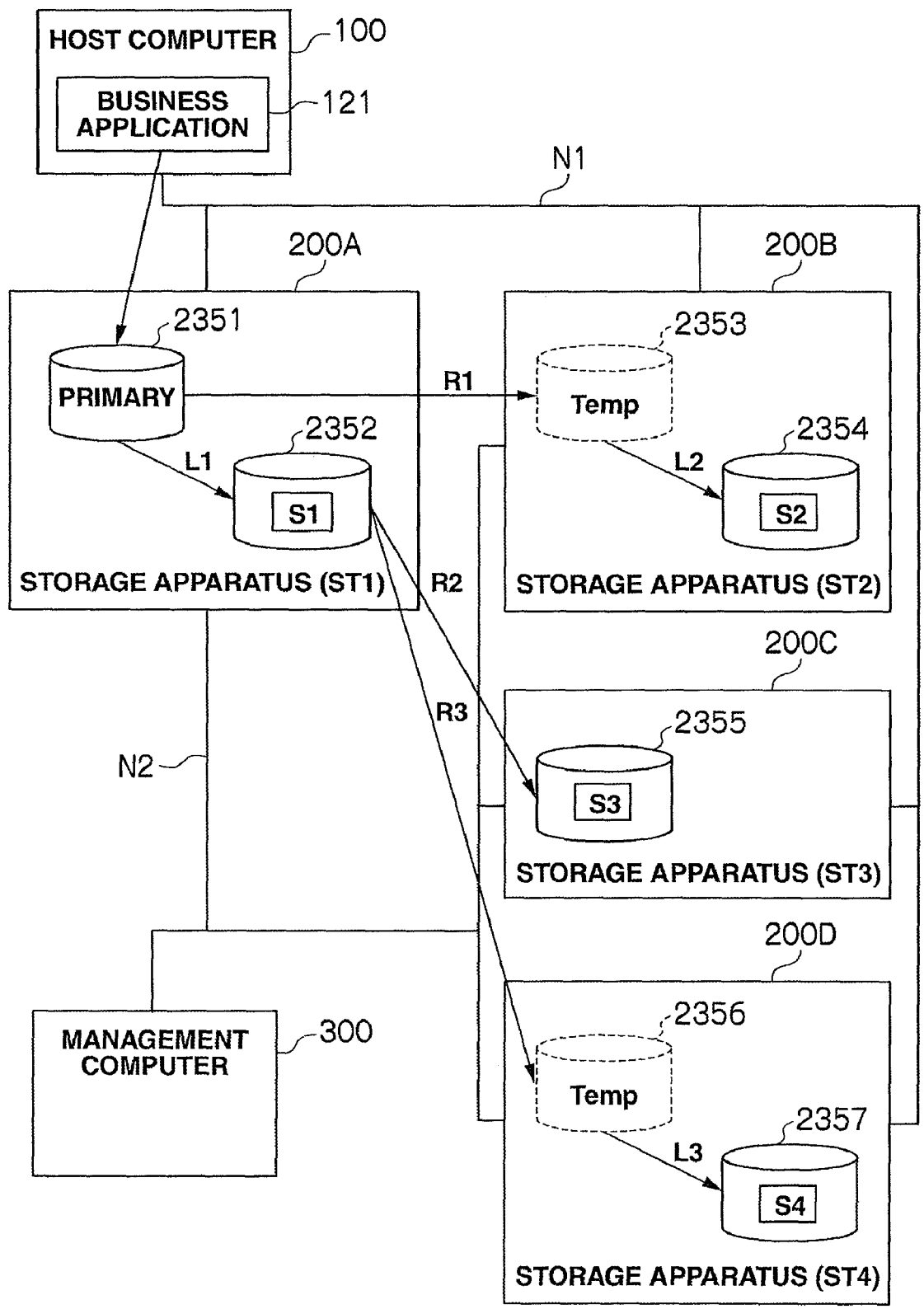
FIG. 13 is a schematic configuration diagram of a computer system comprising a plurality of inter-storage apparatus configurations.

As shown in FIG. 13, in the case of a computer system with a plurality of inter-storage apparatus configurations, the same snapshot can be created between a plurality of different storage apparatuses by selecting the snapshot duplication method to be applied to different storage apparatuses among a plurality of snapshot duplication methods. In the ensuing explanation, as a specific example, let it be assumed that the first method is used as the snapshot duplication method between the storage apparatus 200A and the storage apparatus 200B, the second method is applied between the storage apparatus 200A and the storage apparatus 200C, and the fourth method is applied between the storage apparatus 200A and the storage apparatus 200D. Moreover, let it be assumed that the volumes 2352, 2354, 2355, 2357 belong to the same snapshot group as volumes for storing the snapshots S1 to S4 having the same data contents as the primary volume 2351.

The snapshot management program 326 includes snapshot group creation processing S100, and snapshot creation processing S200 in snapshot group units.

Figure 14:
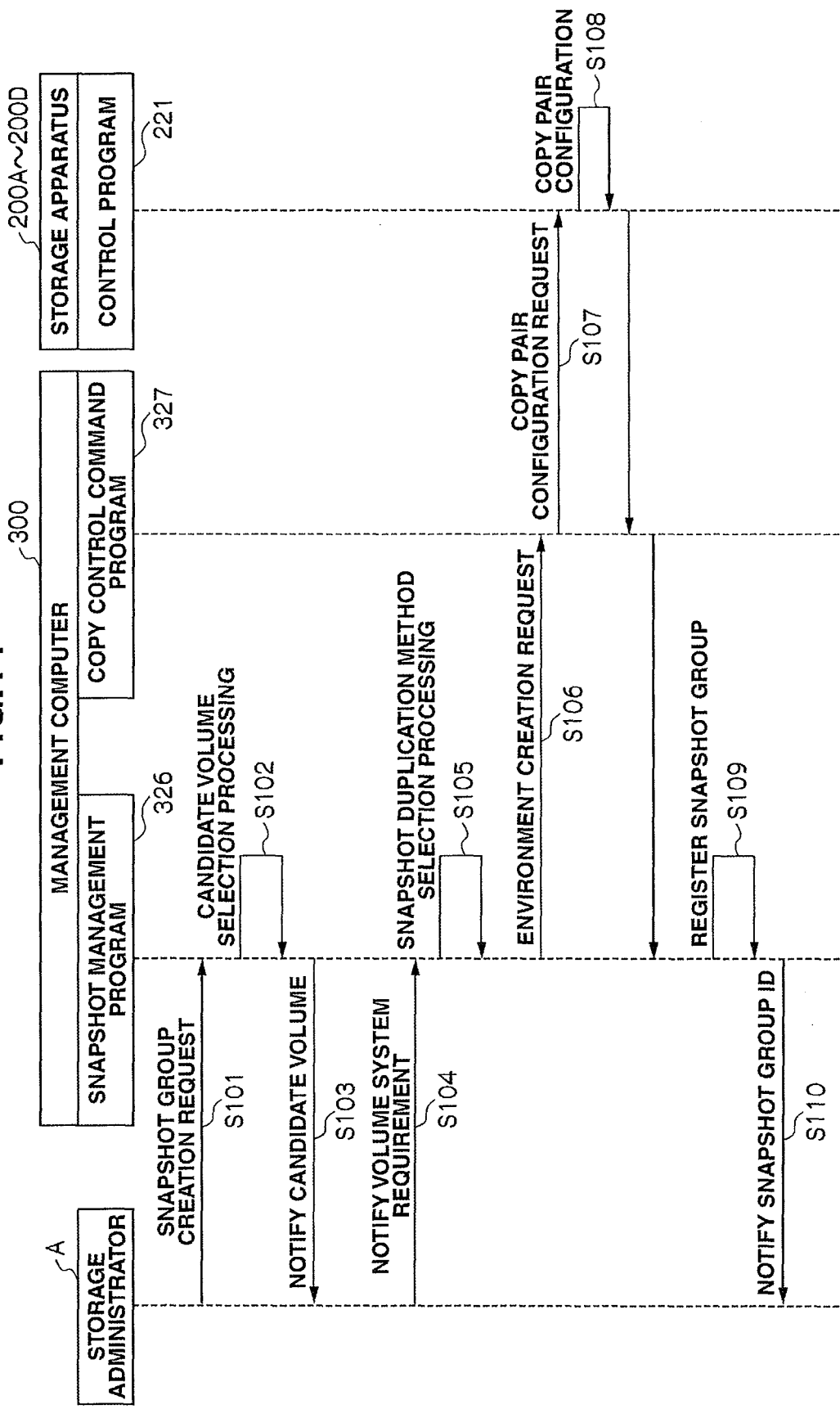
FIG. 14 is a time chart explaining the operation of snapshot creation processing.

The snapshot group creation processing S100 in the computer system shown in FIG. 13 is foremost explained with reference to the time chart of FIG. 14.

When the storage administrator A designates the primary volume 2351 as the snapshot creation target via the input unit 340 of the management computer 300, a snapshot group creation request is issued to the snapshot management program 326 (S101).

Figure 15:
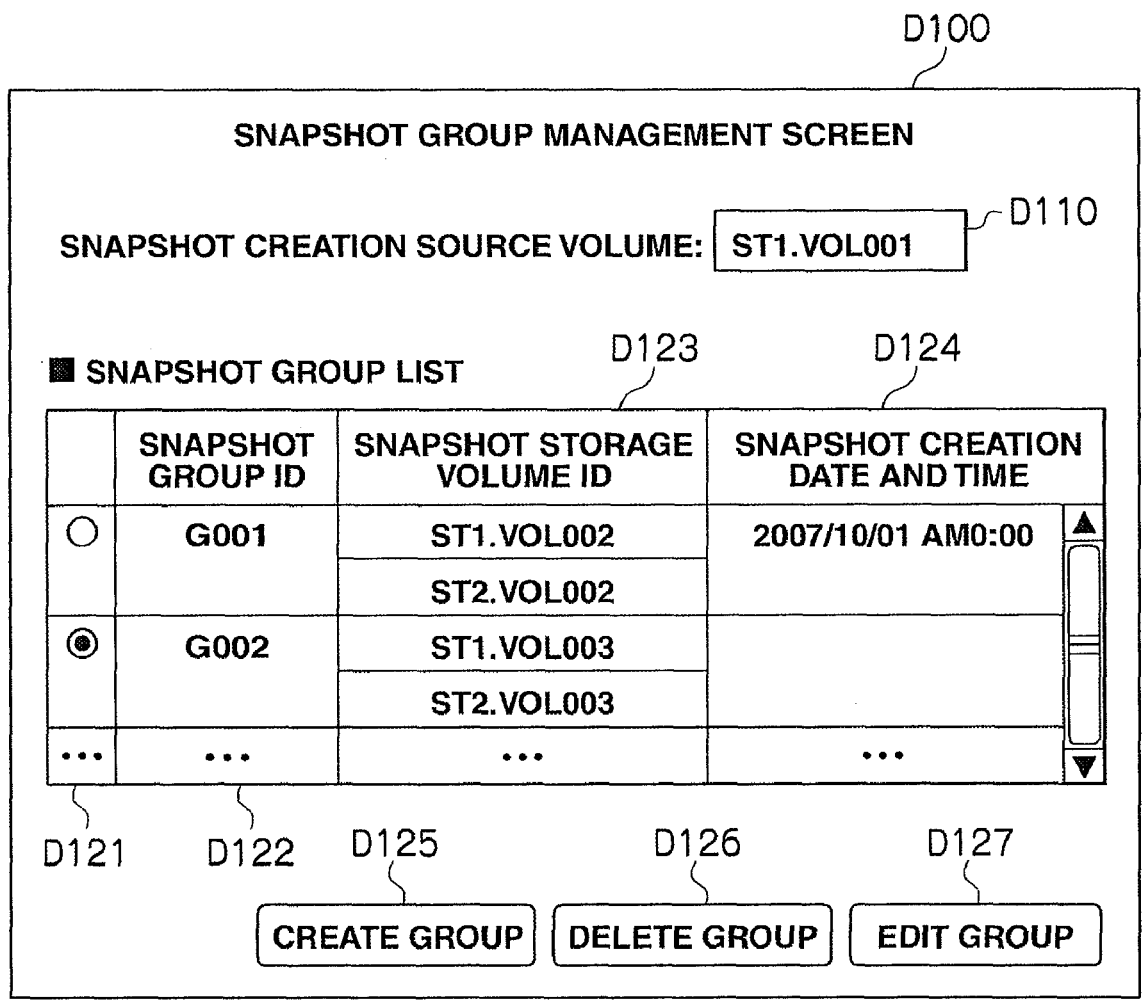
FIG. 15 is a diagram explaining a snapshot group management screen.

Here, the snapshot group management screen D100 to be provided by the snapshot management program 326 to the storage administrator A when the storage administrator A is to issue the snapshot group creation command, as shown in FIG. 15, is configured from a snapshot creation source volume field D110 for displaying the identifier to be used in uniquely identifying the snapshot creation source volume; that is, the primary volume 2351, with the computer system, a selection field D121 for selecting the snapshot group to be edited or deleted, a snapshot group ID field D122 for displaying the identifier to be used in uniquely identifying the snapshot group belonging to the primary volume 2351 with the computer system, a snapshot storage volume field D123 for displaying the identifier to be used in uniquely identifying the volume 235 storing the snapshot belonging to the snapshot group of the snapshot group ID field D122 with the computer system, a snapshot creation date and time field D124 for displaying the date and time the snapshot of the primary volume 2351 was created in the volume 235 displayed in the snapshot storage volume field D123 belonging to the snapshot group of the snapshot group ID field D122, a group create button D125 for starting the processing for creating a new snapshot group belonging to the primary volume 2351, a group delete button D126 for starting the processing of deleting the snapshot group selected in the selection field D121, and a group edit button D127 for starting the processing of adding or deleting the volume 235 belonging to the snapshot group selected in the selection field D121.

Subsequently, the snapshot management program 326 executes the candidate volume selection processing for electing a candidate volume 235 capable of storing the snapshot of the designated primary volume 2351 from the volumes 235 of the storage apparatuses 200A to 200D (S102).

Figure 16:
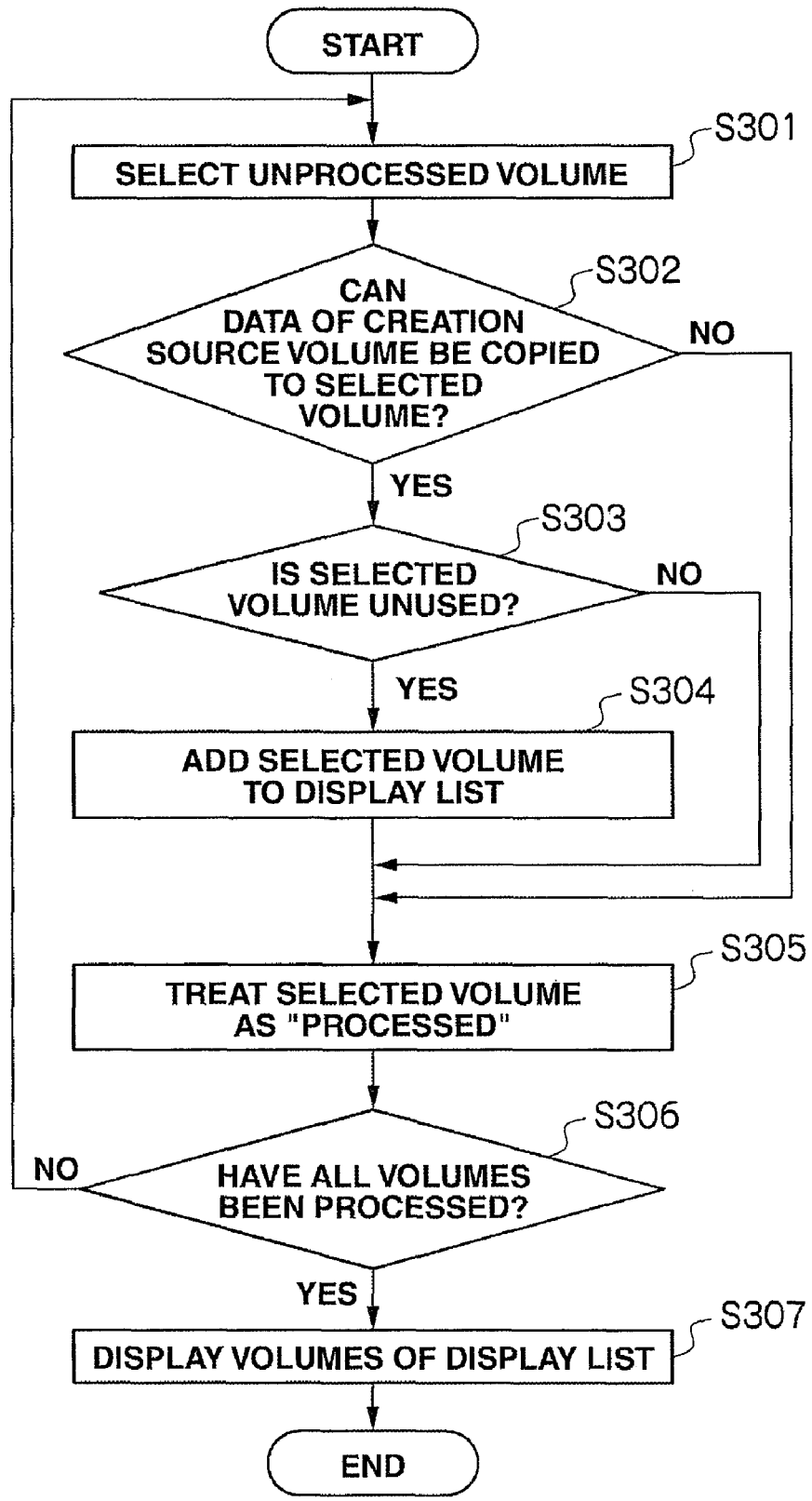
FIG. 16 is a flowchart explaining the operation of the candidate volume selection processing shown in FIG. 14.

As shown in FIG. 16, the candidate volume selection processing selects a volume 235 that has not yet been subject to the candidate volume selection processing from the volume management table 322 (S301), and determines whether data of the volume 235 input to the snapshot creation source volume field D110 can be copied to the selected volume 235 (S302). In this embodiment, copying is determined to be possible if the capacity is equivalent, and the storage apparatuses 200A to 200D retaining the selected volume 235 and the storage apparatuses 200A to 200D retaining the snapshot creation source volume 235 are able to engage in data communication. Data communication is considered possible if the storage apparatuses 200A to 200D are registered in the data communicable apparatus ID field 3215 of the apparatus management table 321. The process proceeds to S305 if it is determined that copying is not possible at S302, and the process proceeds to S303 if it is determined that copying is possible at S302.

The determination of whether data can be copied may also include a condition of the RAID level of the array group being equivalent in addition to the capacity being equivalent. Thereby, since volumes in which the RAID levels of the array groups do not coincide and must be changed or volumes that cannot be changed to equivalent RAID levels will not be selected, candidate volumes for storing snapshots can be easily selected upon storing snapshots.

Subsequently, whether the volume 235 selected at S301 is unused is determined (S303). In this embodiment, the volume 235 is determined to be unused if the allocation destination field 3225 of the volume management table 322 is "null."

If it is determined that the volume 235 selected at S301 is being used, the process proceeds to S305, and, if it is determined that the volume 235 is not being used, the volume 235 selected at S301 is added to the display list (not shown) which is temporarily created in the candidate volume selection processing (S304).

Subsequently, the volume 235 selected at S301 is treated as processed (S305), and whether all volumes 235 of the volume management table 322 have been processed is determined (S306). If there is an unprocessed volume 235 in the volume management table 322, the process returns to S301, and, if all volumes 235 have been processed, the routine proceeds to S307.

Subsequently, the volume 235 added to the created display list is displayed on the volume selection screen D200 described later to be provided to the storage administrator A (S307), and, after displaying all volumes 235 added to the display list, the snapshot management program 326 ends the candidate volume selection processing. Thereby, the candidate volume 235 that can be added to the new snapshot group is notified to the storage administrator A.

Subsequently, the snapshot management program 326 notifies the processing result of the candidate volume selection processing to the storage administrator A via the output unit 250 of the computer 300 (S103). When the storage administrator A inputs the selection of at least one volume 235 to be added to the snapshot group to be created from the notified candidate volume 235 and the system requirement of the volume 235 to become the S/S volume via the input unit 340, these are notified to the snapshot management program 326 (S104).

Here, when the storage administrator A is to input the selection of the volume 235 and the system requirement of the S/S volume, the volume selection screen D200 to be provided by the snapshot management program 326 to the storage administrator A, as shown in FIG. 17, is configured from a snapshot creation source volume field D210 for displaying the identifier to be used in uniquely identifying the snapshot creation source volume; that is, the primary volume 2351, with the computer system, a selection field D220 for selecting the volume 235 to be added to the snapshot group to be created, a storage apparatus ID field D230 for displaying the identifier to be used in uniquely identifying the storage apparatuses 200A to 200D retaining the candidate volume 235 selected in the candidate volume selection processing with the computer system, a volume ID field D240 for displaying the identifier to be used in uniquely identifying the candidate volume 235 selected in the candidate volume selection processing in the storage apparatuses 200A to 200D, a system requirement field D250 for inputting the system requirement of the volume 235, an OK button D260 for notifying the volume 235 to be added to the snapshot group selected in the selection field D220 and its system requirement to the snapshot management program 326, and a cancel button D270 for ending the processing for newly creating the snapshot group belonging to the primary volume 2351. When inputting the system requirement of the volume 235, the screen for inputting the system requirement is launched by pressing the registration button D251, and the clear button D252 is pressed for clearing the registered system requirement.

Subsequently, the snapshot management program 326 executes the snapshot duplication method selection processing for selecting the snapshot duplication method that satisfies the system requirement of the volume 235 input for each S/S volume (S105).

Here, the system requirement requested in the snapshot duplication method to be applied to the S/S volume; that is, the five-stage evaluated values of the RTO, the business I/O processing speed, the RC line dominance, and the inter-storage apparatus distance as indexes of the snapshot duplication method evaluation table 325 are input by the storage administrator A from the system requirement field D250 of the volume selection screen D200.

The snapshot duplication method selection processing selects the snapshot duplication method for all volumes 235 to become the S/S volume using the primary volume 2351 and the A/S volume. Specifically, a volume 235 not yet set with the snapshot duplication method to be applied is foremost extracted from the S/S volume, an index with a high evaluated value is selected by referring to the five-stage evaluated values of the respective indexes input from the system requirement field D250 to the extracted volume 235, and the method corresponding to the evaluated value of the fields 3252 to 3255 of the indexes selected from the snapshot duplication method evaluation table 325 is selected as the snapshot duplication method to be applied to the extracted volume 235. If a plurality of methods are selected, the method used in the inter-storage apparatus configuration is selected as the applicable snapshot duplication method when there is an existing inter-storage apparatus configuration that can be diverted, and, when there is no divertible inter-storage apparatus configuration, the storage administrator A is made to select one index that is to be evaluated the highest among a plurality of indexes so as to decide one applicable snapshot duplication method. Thereby, the optimal snapshot duplication method upon storing the snapshot from the volume 235 of the storage apparatus 200A to the volume 235 of the storage apparatuses 200B to 200D is decided.

When the storage administrator A is to input an evaluated value from the system requirement field D250, in order to prevent all evaluated values from becoming "5," the input of the system requirement field D250 may be an exclusive input giving consideration to the correlation of the respective indexes so that, for example, if the evaluated value of the RTO is "5," the evaluated value of the business I/O processing speed becomes "1."

Subsequently, the snapshot management program 326 sends the snapshot environment creation request designating the primary volume 2351 and the A/S volume and the snapshot duplication method selected at S105 to the copy control command program 327 for every S/S volume selected at S104 (S106), and the copy control command program 327 sends the copy pair configuration request for creating a snapshot duplication environment that satisfies the snapshot environment creation request to the control program 221 of the storage apparatuses 200A to 200D (S107).

The control program 221 of the storage apparatuses 200A to 200D sets the copy pair so as to satisfy the copy pair configuration request (S108). In the specific example of this embodiment, the copy pairs L1, R1, L2, R2, R3, L3 are set.

Upon receiving a copy pair configuration completion notice from the storage apparatuses 200A to 200D, the copy control command program 327 updates the volume management table 322 and the copy pair management table 323, and sends an environment creation completion notice to the snapshot management program 326.

When the snapshot management program 326 receives the environment creation completion notice, it creates the identifier that is able to uniquely identify the snapshot group with the management computer 300, registers the identifier of the created snapshot group in the snapshot group ID field 3241 of the snapshot management table 324, registers the identifier of the primary volume 2351 requested at S101 in the primary ID field 3242, registers the volume 235 selected at S104 in the snapshot storage volume field 3243, registers the identifier of the snapshot duplication method selected at S105 in the snapshot duplication method field 3244, registers the target copy pair contained in the environment creation completion notice of the copy control command program 327 and the copy pair ID field 3231 of the copy pair management table 323 in the target copy pair field 3245, and registers the snapshot group in the snapshot management table 324 (S109).

The snapshot management program 326 notifies the identifier of the created snapshot group to the storage administrator A via the output unit 350 (S110), and then ends the snapshot group creation processing S100.

Figure 18:
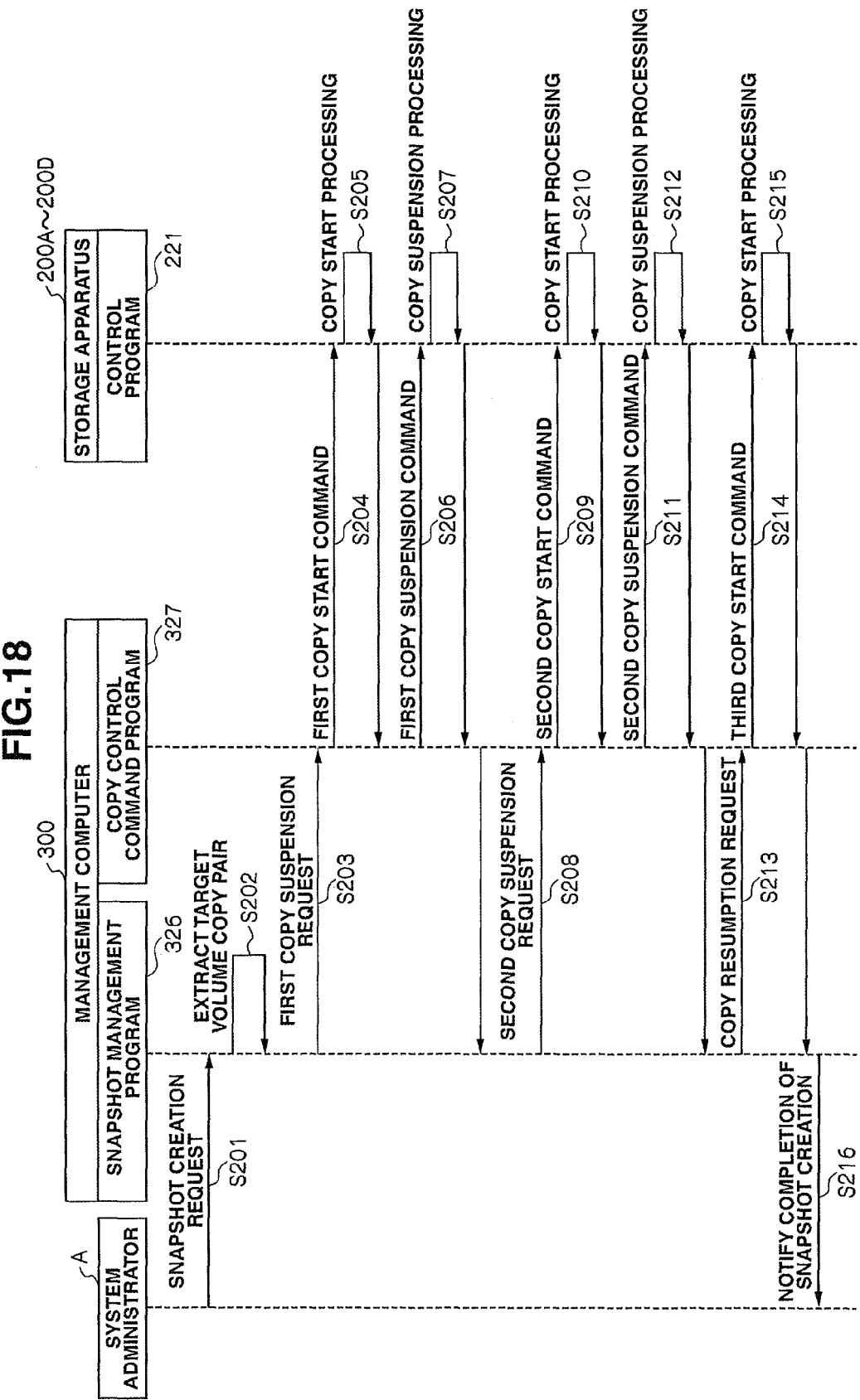
FIG. 18 is a time chart explaining the operation of snapshot creation processing.

The snapshot creation processing S200 in the computer system shown in FIG. 13 is now explained with reference to the time chart shown in the FIG. 18.

When the storage administrator A designates a snapshot group, a snapshot creation command is issued to the snapshot management program 326 (S201). In the specific example of this embodiment, the snapshot group G001 is designated.

The snapshot management program 326 extracts the identifiers of the primary volume, the snapshot storage volume, the snapshot duplication method, and the target copy pair belonging to the snapshot group designated from the respective fields 3242 to 4245 of the snapshot management table 324 (S202).

Subsequently, the snapshot management program 326 extracts all copy pairs in which the primary volume 2351 is the copy source from the extracted target copy pair, changes the status of all extracted copy pairs to a PAIR status, and requests the copy control command program 327 to suspend the copy of the copy pairs at the same timing (S203). In the specific example of this embodiment, the copy pairs L1, R1 are extracted.

The copy control command program 327 updates the copy pair management table 323 to the latest status in order to change the status of all copy pairs requested at S203 to a PAIR status, and sends a command for starting the copy of the copy pairs in a suspended status to the control program 221 of the storage apparatuses 200A, 200B relating to the copy pairs (S204). Thereby, the snapshot of the primary volume 2351 included in the designated snapshot group G001 is stored in the volumes 2352, 2353 of the copy destination of all copy pairs L1, R1 included in the designated snapshot group G001 and in which the primary volume 2351 is the copy source.

The control program 221 of the storage apparatuses 200A, 200B starts the copy of all designated copy pairs (S205), and the copy control command program 327 updates the copy pair management table 323, and, when all copy pairs that started copying at S205 becomes a PAIR status, a command for suspending all copy pairs requested at S203 at the same timing is sent to the control program 221 of the storage apparatus 200A retaining the primary volume 2351 (S206). Thereby, the same snapshot will be stored in the volumes 2352, 2353 of the copy destination of all copy pairs L1, R1 in which the primary volume 2351 is the copy source.

The control program 221 is able to suspend the copy of a plurality of copy pairs having the volumes 235 in the same storage apparatuses 200A to 200D as the copy source at the same timing, and the control program 221 simultaneously suspends the copy of the copy pairs designated at S206 (S207).

When the copy control command program 327 receives the completion notice at S207, it updates the copy pair management table 323 and confirms that the copy of all copy pairs commanded at S206 is suspended, and notifies the copy suspend request completion at S203 to the snapshot management program 326.

When the snapshot management program 326 receives the copy suspend request completion notice of S203, it requests the copy control command program 327 to suspend the copy of all copy pairs at the same timing after changing the copy pairs other than the copy pairs subject to copy suspend at S203 among the copy pairs extracted at S202 to a PAIR status (S208). In the specific example of this embodiment, the copy pairs L2, R2, R3, L3 are the target copy pairs.

The copy control command program 327 sends a command for starting the copy for changing all copy pairs requested at S208 to a PAIR status to the control program 221 of the storage apparatuses 200A to 200D relating to the copy pairs (S209). Thereby, the snapshot of the primary volume 2351 included in the designated snapshot group G001 is stored in the volumes 2354, 2355, 2356, 2357 of the copy destination of the copy pairs L2, R2, R3, L3 other than all copy pairs included in the designated snapshot group G001 and in which the primary volume 2351 is the copy source.

The control program 221 of the storage apparatuses 200A to 200D starts the copy of all designated copy pairs (S210), the copy control command program 327 updates the copy pair management table 323, and, when all copy pairs designated at S209 become a PAIR status, a command for suspending the copy of the copy pairs designated at S208 is sent to the control program 221 of the storage apparatuses 200A to 200D relating to the copy pairs (S211). Thereby, the same snapshot will be stored in the volumes 2354, 2355, 2356, 2357 of the copy destination of the copy pairs L2, R2, R3, L3 other than all copy pairs in which the primary volume 2351 is the copy source.

The control program 221 that received the command simultaneously suspends the copy of the copy pairs designated at S211 (S212).

When the copy control command program 327 receives the completion notice of S212, it updates the copy pair management table 323, confirms that the copy of all copy pairs designated at S211 has been suspended, and sends the copy suspend request completion notice of S208 to the snapshot management program 326.

When the snapshot management program 326 receives the copy suspend request completion notice of S208, it registers the current date and time in the snapshot creation date and time field 3246 of the snapshot management table 324. Although this embodiment registers the date and time that the copy suspend request completion notice of S208 was received in the snapshot creation date and time field 3246, the present invention is not limited thereto, and the snapshot management program 326 may also register the date and time that the copy suspend request completion notice of S203 was received in the snapshot creation date and time field 3246.

Subsequently, the snapshot management program 326 extracts the copy pairs being used in the snapshot groups other than the snapshot groups requested at S201, and sends the copy start command of the extracted copy pairs to the copy control command program 327 (S213). Thereby, copy of the copy pairs to be shared with the snapshot groups other than the designated snapshot groups is started.

Here, the copy pair identifier can be uniquely identified in the management computer 300, and the identifier of the copy pair to be used in the snapshot group is registered in the target copy pair field 3245 of the snapshot management table 324. Thus, in order to extract the copy pairs being used in the other snapshot groups, the target copy pair field 3245 of other snapshot groups of the snapshot management table 324 is referred to and, if a copy pair coinciding with the identifier of the copy pair used by the snapshot group requested at S201 is registered in the target copy pair field 3245, this is extracted as the copy pair being used by other snapshot groups.

The copy control command program 327 sends a command for starting the copy of the copy pairs requested at S213 to the control program 221 of the storage apparatuses 200A to 200D relating to the extracted copy pairs (S214), and the control program 221 starts the copy of the designated copy pairs (S215).

When the copy control command program 327 receives a copy start completion notice of the copy pairs from the control program 221, it sends the request processing completion notice of S213 to the snapshot management program 326, and the snapshot management program 326 sends the snapshot creation completion notice to the storage administrator A (S216), and then ends the snapshot creation processing S200.

The operation of notifying the available snapshot when a failure occurs in the computer system shown in FIG. 13 is now explained with reference to FIG. 19 to FIG. 21.

The failure information collection program 329 periodically requests a failure status notification to the configuration information notification program 122 of the host computer 100 and the control program 221 of the storage apparatuses 200A to 200D via the management network N2. If the storage administrator A requests the snapshot storage location notification via the input unit 340 of the management computer 300, a failure status notification is requested to the control program 221 of the storage apparatuses 200A to 200D. If failure information is included in the response from the host computer 100 and/or the storage apparatuses 200A to 200D, the failure information collection program 329 notifies the failure information to the snapshot management program 326.

When the failure information is notified, the snapshot management program 326 extracts an available volume 235 from the snapshot group, and notifies the extracted volume 235 to the storage administrator A via the output unit 350 of the management computer 300. If there is a snapshot group in which a snapshot is not created, the volume 235 that is not able to create a snapshot is extracted from the notified failure information, and the extracted volume 235 is notified to the storage administrator A via the output unit 350 of the management computer 300.

Figure 19:
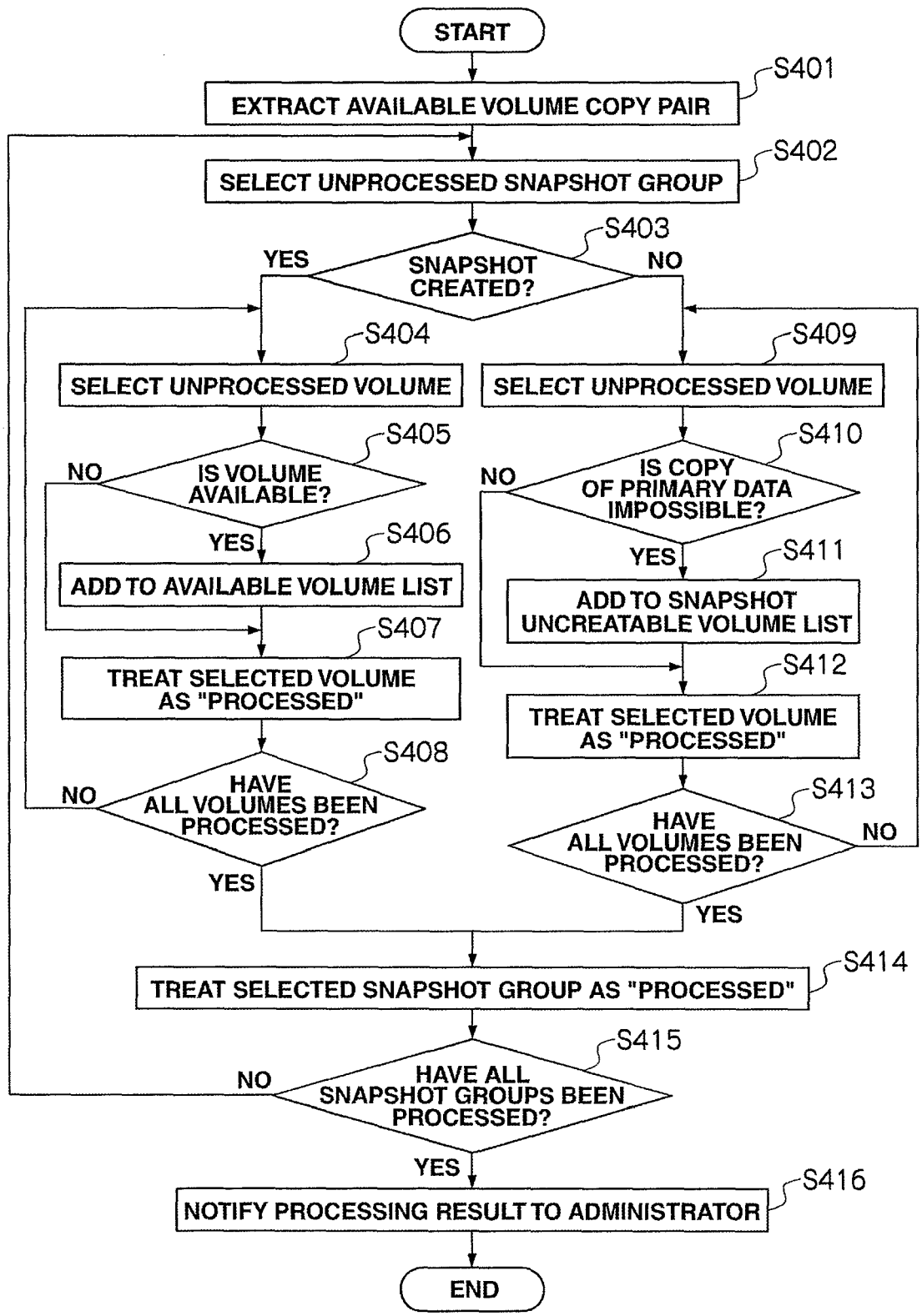
FIG. 19 is a flowchart explaining the operation of processing upon detecting a failure.

More specifically, when the snapshot management program 326 is notified of the failure information from the failure information collection program 329, it starts the processing upon detecting a failure as shown in FIG. 19.

The snapshot management program 326 refers to the volume management table 322, the copy pair management table 323 and the notified failure information, and extracts the volumes 235 and the copy pairs that are no longer available due to a failure (S401).

Subsequently, the snapshot management program 326 refers to the snapshot management table 324 and selects the snapshot group that has not yet been subject to the processing of S402 (S402), refers to the snapshot creation date and time field 3246 of the snapshot management table 324, and determines whether a snapshot is created in the snapshot group selected at S402 (S403). Here, it is determined that a snapshot has not been created if the snapshot creation date and time field 3246 is "null," and determined that a snapshot has been created in all cases other than "null."

When it is determined that a snapshot has been created at S403, the snapshot management program 326 selects a volume 235 belonging to the snapshot group selected at S402 and which has not yet been subject to the processing of S404

(S404), and determines whether the selected volume 235 is available (S405). Here, it is determined that the volume 235 is unavailable if the volume 235 selected at S404 corresponds to the volume 235 extracted at S401, and determined that the volume 235 is available if the volume 235 selected at S404 does not correspond to the volume 235 extracted at S401.

If the volume 235 is determined to be unavailable at S405, the process proceeds to S407, and if the volume 235 is determined to be available at S405, the volume 235 selected at S404 is added to the available volume list (not shown), which is a list that is temporarily created in the processing to be performed upon detecting a failure (S406).

Subsequently, the volume 235 selected at S404 is treated as having been subject to the processing of S404 (S407), and the snapshot management program 326 determines whether the processing of S404 has been performed to all volumes 235 belonging to the snapshot group selected at S402 (S408). If there is an unprocessed volume 235, the routine returns to S404, and if there is no unprocessed volume 235; that is, if the processing of S404 has been performed to all volumes 235 belonging to the snapshot group selected at S402, the process proceeds to S414.

If it is determined that a snapshot has not been created at S403, the snapshot management program 326 selects a volume belonging to the snapshot group selected at S402 and which has not yet been subject to the processing of S409 (S409), and determines whether the data of the primary volume 2351 cannot be copied (S410). Here, the snapshot management program 326 refers to the copy pair management table 323 to extract all copy pairs up to the primary volume 2351 from the volume 235 selected at S409, and determines that the data of the primary volume 2351 can be copied if none of the extracted copy pairs corresponds to the copy pair extracted at S401, and determines that the data of the primary volume 2351 cannot be copied if even one of the extracted copy pairs corresponds to the copy pair extracted at S401.

If it is determined that the data can be copied at S410, the process proceeds to S412, and if it is determined that the data cannot be copied at S410, the volume 235 selected at S409 is added to a snapshot uncreatable volume list (not shown), which is a list to be temporarily created in this processing (S411).

Subsequently, the volume 235 selected at S409 is treated as having been subject to the processing of S409 (S412), and the snapshot management program 326 determines whether the processing of S409 has been performed to all volumes 235 belonging to the snapshot group selected at S402 (S413), returns to S409 is there is an unprocessed volume 235, and proceeds to S414 if there is no unprocessed volume 235; that is, if the processing of S409 has been performed to all volumes 235 belonging to the snapshot group selected at S402.

Subsequently, the snapshot group selected at S402 is treated as having been subject to the processing at S302 (S414), and the snapshot management program 326 determines whether the processing of S302 has been performed to all snapshot groups (S415), returns to S402 if there is a snapshot group that has not yet been subject to the processing of S402, and proceeds to S416 is there is no unprocessed snapshot group; that is, if the processing of S302 has been performed to all snapshot groups.

Subsequently, the snapshot management program 326 refers to the available volume list created at S406, and, as shown in FIG. 20, notifies the available volume list screen D300 including the volume 235 registered in the available volume list, the snapshot group to which the volume 235 belongs, and the snapshot creation date and time to the storage administrator A via the output unit 350, refers to the snapshot uncreatable volume list created at S411, and, as shown in FIG. 21, notifies the snapshot creation availability screen D400 including the volume 235 registered in the snapshot uncreatable volume list and the snapshot group to which the volume 235 belongs to the storage administrator A via the output unit 350 (S416). Thereby, the volumes 235 other than volumes 235 that are no longer available due to a failure among the volumes 235 storing the snapshot of the primary volume 2351 are notified to the storage administrator A. In addition, the volumes 235 that are not able to store the snapshot of the primary volume 2351 due to a failure are also notified to the storage administrator A.

After notifying the available volume list screen D300 and/or the snapshot creation availability screen D400 to the storage administrator A, the snapshot management program 326 ends the processing to be performed when a failure is detected.

As a more specific example, processing to be performed when a failure is detected is now explained in a case where the volumes 2352, 2354, 2355, 2357 shown in FIG. 13 belong to the same snapshot group G001, a snapshot is already created in the snapshot group G001, and the failure information collection program 329 detects that the storage apparatuses 200B, 200C are damaged and all of the volumes 2353, 2354, 2355 of the storage apparatuses 200B, 200C are unavailable.

When the snapshot management program 326 receives a failure information notification, it extracts the Temp volume 2353 and the volumes 2354, 2345 as the volumes 235 that are unavailable in the processing of S401.

Subsequently, the snapshot management program 326 selects the snapshot group G001 in the processing of S402, and, since a snapshot is already created in the snapshot group G001, performs the processing of S404. When the processing of S404 to S407 is performed, the Temp volume 2356 and the volumes 2352, 2357 are added to the available volume list created at S406.

Subsequently, in the processing of S416, the snapshot management program 326 notifies the available volumes 2352, 235 in the snapshot group G001 as shown in FIG. 20 to the storage administrator A.

The processing to be performed when a failure is detected is now explained in a case where the volumes 2352, 2354, 2355, 2357 belong to the same snapshot group G002, a snapshot is not created in the snapshot group G002, and the failure information collection program 329 detects that the array group to which the volume 2352 belongs is unavailable from the storage apparatus 200A.

When the snapshot management program 326 receives the failure information notification, it extracts information indicating that the volume 2352 and the copy pairs L1, R2, R3 are unavailable in the processing of S401.

Subsequently, the snapshot management program 326 selects the snapshot group G002 in the processing of S402, and performs the processing of S409 since a snapshot has not been created in the snapshot group G002.

Subsequently, the snapshot management program 326 selects the volume 2352 that has not yet been subject to the processing of S409 in the snapshot group G002 in the processing of S409. The copy pair L1 from the volume 2352 to the primary volume 2351 is extracted as an unavailable copy pair at S402. Thus, the volume 2352 is added to the snapshot uncreatable volume list in the processing of S411.

The snapshot management program 326 thereafter returns to S409 and selects the volume 2354. The copy pairs L2, R1 from the volume 2354 to the primary volume 2351 do not correspond to the unavailable copy pair extracted at S401. Thus, the snapshot management program 326 returns to S409 without performing the processing of S411, and selects the volume 2355. The copy pairs R2, L1 from the volume 2355 to the primary volume 2351 correspond to the unavailable copy pairs extracted at S401. Thus, the volume 2355 is added to the snapshot uncreatable volume list.

The snapshot management program 326 thereafter returns to S409 and selects the volume 2357, and the copy pair R3 among the copy pairs L3, R3 from the volume 2357 to the primary volume 2351 corresponds to the unavailable copy pair extracted at S401. Thus, the volume 2357 is added to the snapshot uncreatable volume list.

Subsequently, the snapshot management program 326 notifies the volumes 2352, 2355, 2357 as the snapshot uncreatable volumes shown in FIG. 21 to the storage administrator A in the processing of S416.

Like this, according to the present invention, since a copy pair of a copy source and a copy destination forming a pair is created so that the snapshot of the primary volume 2351 included in the snapshot group is stored in all volumes 235 included in that snapshot group, and all copy pairs included in that snapshot group becomes a PAIR status when there is a creation request of a snapshot of the primary volume 2351 designating the snapshot group, the snapshot of the primary volume 2351 included in the designated snapshot group can be stored in all volumes 235 included in the designated snapshot group. Thus, the snapshots to be duplicated between the storage apparatus 200A and the storage apparatuses 200B to 200D can be consolidated with only the snapshot group, and the management of snapshots to be multiplexed between different storage apparatuses can be facilitated thereby.

In addition, when there is a creation request of a snapshot of the primary volume 2351 designating a snapshot group, all copy pairs will simultaneously become a suspended status after the copying of all copy pairs in which the primary volume 2351 included in the snapshot group is the copy source is completed. Thus, since the same snapshot can be stored in the volume 235 of the copy destination of all copy pairs having the primary volume 2351 included in the designated snapshot group as the copy source, the creation date and time of the snapshot of all volumes 235 included in the snapshot group will coincide, and the generation management of snapshots to be multiplexed between different storage apparatuses can be facilitated thereby.

Moreover, since the copy pairs included in the other snapshot groups among the copy pairs in a suspended status will become a PAIR status, the copying of copy pairs to be shared with the snapshot groups other than the designated snapshot group can be started, and the management of snapshots to be multiplexed between different storage apparatuses can be further facilitated without affecting the snapshot creation of other snapshot groups.

Further, since the snapshot duplication method to be applied between the storage apparatus 200A and the storage apparatuses 200B to 200D is decided based on the snapshot duplication evaluation table 325 which evaluates a plurality of snapshot duplication methods with a prescribed index, it is possible to decide the optimal snapshot duplication method upon storing the snapshot from the volume 235 of the storage apparatus 200A to the volume 235 of the storage apparatuses 200B to 200D. Thus, it is possible to issue a snapshot creation command without having to give consideration to the inter-storage apparatus configuration between the storage apparatus 200A and the storage apparatuses 200B to 200D, and the management of snapshots to be multiplexed between different storage apparatuses can be further facilitated.

In addition, upon creating a snapshot group, since a volume 235 capable of storing the snapshot of the primary volume 2351 and which is not included in an existing snapshot group is output, it is possible to notify the candidate volume 235 that may be added to the new snapshot group to the storage administrator A, and the storage administrator A will thereby be able to easily select the volume 235 to be added to the snapshot group to be newly created.

Moreover, since the available volume 235 is output based on the acquired failure information among the volumes 235 storing the snapshot of the primary volume 2351, it is possible to notify the storage administrator A of the volumes 235 storing the snapshot of the primary volume 2351 and which are other than the volumes 235 that are no longer available due to a failure. Thus, the storage administrator A is able to easily comprehend the available volumes 235 storing the snapshot of the primary volume 2351, and, for example, will be able to change the volume 235 to be used by the business application or restore the same to the primary volume 2351.

Further, since the volumes that are not able to store the snapshot of the primary volume 2351 are output based on the acquired failure information, it is possible to notify the storage administrator A of the volumes 235 that are not storing the snapshot of the primary volume 2351 and which cannot store the snapshot of the primary volume 2351 due to a failure. Thus, the storage administrator A is able to easily comprehend the volumes that are not storing, and which cannot store, the snapshot of the primary volume 2351.

The configuration of the present invention is not limited to the foregoing embodiments, and may be subject to various modifications within a range that does not deviate from the gist of this invention.

What is claimed is:

1. A backup data management system, comprising:
a first storage apparatus connected to a computer and having a first storage area to be used by the computer;
at least one second storage apparatus connected to the first storage apparatus and having a second storage area; and
a backup data management computer connected to the first storage apparatus and the second storage apparatus;
wherein the backup data management computer includes:
a backup group creation unit configured to create a backup group including the first storage area and at least one second storage area;
a copy pair creation unit configured to create a copy pair of a copy source and a copy destination forming a pair so that backup data of the first storage area included in the backup group is stored in all second storage areas included in the backup group; and
a copy command unit configured to set all copy pairs included in the backup group to a copy status when there is a creation request of backup data of the first storage area designating the backup group.

2. The backup data management system according to claim 1,
wherein the first storage apparatus includes a third storage area configured to store backup data of the first storage area; and
wherein the copy pair creation unit creates a copy pair of a copy source and a copy destination forming a pair so that backup data of the first storage area included in the backup group is stored in all second storage areas included in the backup group and the third storage area included in the backup group.

3. The backup data management system according to claim 2,
wherein the backup data management computer includes a copy stop command unit configured to set all the copy pairs to a copy stop status simultaneously, when there is a creation request of backup data of the first storage area designating the backup group, after the copying all copy pairs with the first storage area included in the backup group as the copy source is complete.

4. The backup data management system according to claim 3,
wherein the backup data management computer includes a copy resumption unit configured to set the copy pairs contained in other backup groups to a copy status among the copy pairs in which the copy process was stopped by the copy stop command unit.

5. The backup data management system according to claim 2,
wherein the backup data management computer includes:
an evaluation information storage unit configured to store evaluation information as an evaluation of a plurality of copy methods between the first storage apparatus and the second storage apparatus according to a prescribed index; and
a copy method determination unit configured to determine the copy method between the first storage apparatus and the second storage apparatus based on the evaluation information.

6. The backup data management system according to claim 2,
wherein the backup data management computer includes a candidate storage area output unit configured to output the second storage area capable of storing backup data of the first storage area and which is not included in the existing backup group upon creating a backup group with the backup group creation unit.

7. The backup data management system according to claim 2,
wherein the backup data management computer includes:
a failure information acquisition unit configured to acquire failure information concerning the first storage apparatus and/or the second storage apparatus; and
an available storage area output unit configured to output the available second storage area and third storage area based on the failure information among the second storage areas and the third storage areas storing backup data of the first storage area.

8. The backup data management system according to claim 2,
wherein the backup data management computer includes:
a failure information acquisition unit configured to acquire failure information concerning the first storage apparatus and/or the second storage apparatus; and
an unavailable storage area output unit configured to output the second storage area and third storage area which are not able to store backup data of the first storage area based on the failure information.

9. A backup data management method to be used in a backup data management system, comprising:
a first storage apparatus connected to a computer and having a first storage area to be used by the computer;
at least one second storage apparatus connected to the first storage apparatus and having a second storage area; and
a backup data management computer connected to the first storage apparatus and the second storage apparatus;
wherein the backup data management method comprises:
a backup group creation step for creating a backup group including the first storage area and at least one second storage area;
a copy pair creation step for creating a copy pair of a copy source and a copy destination forming a pair so that backup data of the first storage area included in the backup group is stored in all second storage areas included in the backup group; and
a copy command step for setting all copy pairs included in the backup group to a copy status when there is a creation request of backup data of the first storage area designating the backup group.

10. The backup data management method according to claim 9,
wherein the first storage apparatus includes a third storage area configured to store backup data of the first storage area; and
wherein, at the copy pair creation step, a copy pair of a copy source and a copy destination forming a pair is created so that backup data of the first storage area included in the backup group is stored in all second storage areas included in the backup group and the third storage area included in the backup group.

11. The backup data management method according to claim 10, further comprising a copy stop command step for simultaneously setting all the copy pairs to a copy stop status, when there is a creation request of backup data of the first storage area designating the backup group, after the copying all copy pairs with the first storage area included in the backup group as the copy source is complete.

12. The backup data management method according to claim 11, further comprising a copy resumption step for setting the copy pairs contained in other backup groups to a copy status among the copy pairs in which the copy process was stopped at the copy stop command step.

13. The backup data management method according to claim 10,
wherein the backup data management computer includes an evaluation information storage unit configured to store evaluation information as an evaluation of a plurality of copy methods between the first storage apparatus and the second storage apparatus according to a prescribed index; and
wherein the backup data management method further comprises a copy method determination step for determining the copy method between the first storage apparatus and the second storage apparatus based on the evaluation information.

14. The backup data management method according to claim 10, further comprising a candidate storage area output step for outputting the second storage area capable of storing backup data of the first storage area and which is not included in the existing backup group upon creating a backup group at the backup group creation step.

15. The backup data management method according to claim 10, further comprising:
a failure information acquisition step for acquiring failure information concerning the first storage apparatus and/or the second storage apparatus; and
an available storage area output step for outputting the available second storage area and third storage area based on the failure information among the second storage areas and the third storage areas storing backup data of the first storage area.

16. The backup data management method according to claim 10, further comprising:
a failure information acquisition step for acquiring failure information concerning the first storage apparatus and/or the second storage apparatus; and
an unavailable storage area output step for outputting the second storage area and third storage area which are not able to store backup data of the first storage area based on the failure information.

* * * * *